US011487176B2

(12) United States Patent
Fujikawa

(10) Patent No.: US 11,487,176 B2
(45) Date of Patent: Nov. 1, 2022

(54) ELECTRO-OPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 147 days.

(21) Appl. No.: 17/063,894

(22) Filed: Oct. 6, 2020

(65) Prior Publication Data

US 2021/0103193 A1    Apr. 8, 2021

(30) Foreign Application Priority Data

Oct. 7, 2019   (JP) .............................. JP2019-184366

(51) Int. Cl.
*G02F 1/1362*   (2006.01)
*G09G 3/00*   (2006.01)

(52) U.S. Cl.
CPC ....... *G02F 1/136286* (2013.01); *G09G 3/006* (2013.01); *G09G 2300/0426* (2013.01); *G09G 2310/0286* (2013.01); *G09G 2310/0297* (2013.01)

(58) Field of Classification Search
CPC .............. G02F 1/136286; G09G 3/006; G09G 2300/0426; G09G 2310/0286; G09G 2310/0297
See application file for complete search history.

(56) References Cited

U.S. PATENT DOCUMENTS

| 2006/0060851 | A1 | 3/2006 | Kawata |
| 2017/0261542 | A1* | 9/2017 | Onishi ................... G01R 27/02 |
| 2018/0122326 | A1* | 5/2018 | Seo ....................... G09G 3/2092 |
| 2020/0006452 | A1* | 1/2020 | Lee ...................... H01L 27/0288 |
| 2020/0074953 | A1* | 3/2020 | Takahashi ............ G09G 3/3677 |

FOREIGN PATENT DOCUMENTS

| JP | H07-294952 A | 11/1995 |
| JP | H08-248430 A | 9/1996 |
| JP | 2006-091239 A | 4/2006 |
| JP | 2018-185415 A | 11/2018 |

* cited by examiner

*Primary Examiner* — Kenneth B Lee, Jr.
(74) *Attorney, Agent, or Firm* — Oliff PLC

(57) ABSTRACT

A first substrate of an electro-optical device includes a data line, a switching element of a demultiplexer, which is provided corresponding to the data line, and a selection signal supply wiring configured to supply a selection signal for selecting one data line, among a plurality of the data lines grouped into blocks, to the switching element. The first substrate also includes a resistance member for electrically connecting the selection signal supply wirings adjacent to each other. Thus, all of the selection signal supply wirings can be supplied with a selection signal for analysis, when a probe is brought into contact with an inspection terminal.

10 Claims, 16 Drawing Sheets

ELECTRO-OPTICAL DEVICE AND ELECTRONIC APPARATUS

The present application is based on, and claims priority from JP Application Serial Number 2019-184366, filed Oct. 7, 2019, the present disclosure of which is hereby incorporated by reference herein in its entirety.

BACKGROUND

1. Technical Field

The present disclosure relates to an electro-optical device provided with a selection signal supply wiring configured to select one data line from a plurality of the data lines grouped into blocks, and an electronic apparatus.

2. Related Art

An electro-optical device such as a liquid crystal device that employs demultiplexer scheme, causes a plurality of data lines extending in a display region of a substrate to be grouped into blocks, and causes a demultiplexer to distribute an image signal supplied from an image signal wiring provided corresponding to each of the blocks to the data line. The demultiplexer causes a selection signal supplied from a plurality of selection signal supply wirings to control a plurality of switching elements. Thus, the electro-optical device of demultiplexer scheme, in which no data line driving circuit provided with a shift register is formed, causes, when inspecting the substrate, a probe to be brought into contact with an inspection terminal electrically coupled to each of the plurality of selection signal supply wirings to apply a selection signal for inspection to the selection signal supply wiring (see JP 2018-185415 A).

However, in a configuration described in JP 2018-185415 A, an issue arises in that, when specifying a failure location at the substrate by an analyzer, all of the plurality of selection signal supply wirings cannot be easily supplied with a selection signal for analysis from the probe at the same time. For example, an EMission MIcroscope (EMMI) or the like is used when specifying a short-circuited location between the data line and a capacitor line in the display region. The EMMI optically detects infrared light generated when a current flows through the short-circuited location, to visualize the short-circuited location. In order to conduct an observation with the EMMI, the probe is brought into contact with all of a plurality of the inspection terminals each provided for each of the selection signal supply wirings to supply the selection signal for analysis of an ON level to the switching element of the demultiplexer, thus causing the plurality of data lines to be electrically coupled with the image signal wiring to energize the plurality of data lines via the image signal wiring. That is, multiple probes need to be used at the same time. Unfortunately, in a device of the EMMI, the multiple probes are restricted in using at the same time, due to a large size of a single probe. Further, in the configuration described in JP 2018-185415 A, a part of the display region, which is hidden by the probe, prevents the entirety of the display region from being observed, which makes it difficult to cause all of the plurality of selection signal supply wirings to be supplied with the selection signal for analysis from the probe at the same time.

SUMMARY

In order to resolve the above-described issue, an electro-optical device according to the present disclosure includes a data line, a switching element provided corresponding to the data line, a selection signal supply wiring configured to supply a selection signal to the switching element, the selection signal being for selecting one data line among a plurality of the data lines grouped into blocks, and a resistance member for electrically coupling the selection signal supply wirings adjacent to each other.

An electro-optical device according to the present disclosure can be used for various types of electronic apparatuses such as a direct-view-type display apparatus and a projection-type display apparatus. The electronic apparatus, when it is the projection-type display apparatus, includes a light source unit configured to emit light being supplied to the electro-optical device, and a projection optical system configured to project light being modulated by the electro-optical device.

DESCRIPTION OF EXEMPLARY EMBODIMENTS

Figure 1:
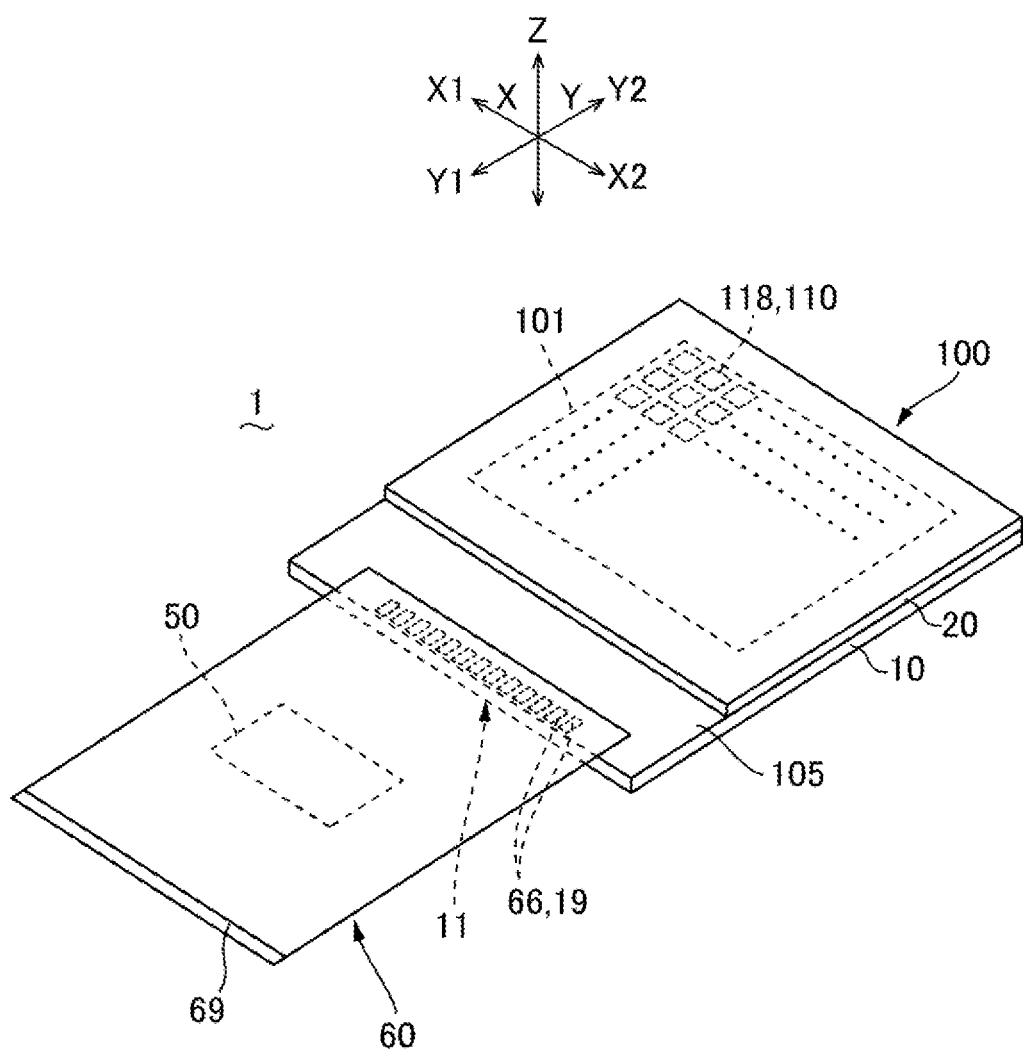
FIG. 1 is an explanatory view illustrating an electro-optical device to which the present disclosure is applied.

Embodiments of the present disclosure will be described below with reference to the drawings. Note that, in each of the drawings to be referenced in the description below, to make members and the like recognizable in terms of size in the drawings, the members and the like are illustrated in different scales, as well as the number of the members is reduced. Hereinafter, each of directions is indicated using an orthogonal coordinate system composed of an X-axis, a Y-axis, and a Z-axis. A Z-axis direction coincides with a thickness direction of an electro-optical device 1, a Y-axis direction coincides with an extending direction in which a wiring substrate extends, and an X-axis direction coincides with a width direction orthogonal to the extending direction in which the wiring substrate extends.

Embodiment 1

Overall Configuration

FIG. 1 is a perspective view of an aspect of the electro-optical device 1 to which the present disclosure is applied. The electro-optical device 1, which is a liquid crystal device used for a light valve that will be described later, includes a liquid crystal panel serving as an electro-optical panel 100. The electro-optical device 1 includes a plurality of pixel electrodes 118 formed at a first substrate 10, a common electrode (not illustrated) formed at a second substrate 20, and an electro-optical layer (not illustrated) composed of a liquid crystal layer provided between the first substrate 10 and the second substrate 20. The pixel electrode 118 faces the common electrode with the electro-optical layer interposed in between to constitute a pixel 110. In the electro-optical device 1, the second substrate 20 and the first substrate 10 are bonded together by a seal material (not illustrated), and the electro-optical layer is provided in a region surrounded by the seal material. In the electro-optical device 1, a region in which the pixel electrodes 118 (the pixels 11) are arrayed in the X-axis direction and the Y-axis direction forms a display region 101.

The electro-optical device 1 of Embodiment 1 serves as a liquid crystal device of a transmissive type. Thus, a substrate main body of the first substrate 10 and the substrate main body of the second substrate 20 are composed of a transparent substrate such as a heat-resistant glass or a quartz substrate. In the electro-optical device 1 of a transmissive type, illumination light entered from one of the first substrate 10 or the second substrate 20 is modulated from the time of the entry to one substrate to the time of exit from the other substrate, to be emitted as a display light, for example. In Embodiment 1, the illumination light entered from the second substrate 20 is modulated from the time of the entry to the time of exit from the first substrate 10, to be emitted as the display light.

The first substrate 10 includes an overhanging portion 105 overhanging from an end portion of the second substrate 20 in a Y1 direction, which is one side in the Y-axis direction. The overhanging portion 105 is provided with a terminal region 11 in which a plurality of mounting terminals 19 are aligned at a predetermined pitch along a side extending in a width direction (in the X-axis direction) of the first substrate 10. The electro-optical device 1 includes a wiring substrate 60 having flexibility that is electrically coupled to the terminal region 11, where the wiring substrate 60 extends in the Y1 direction in a manner being separated from the first substrate 10. The wiring substrate 60 includes, at an end portion on a side of the first substrate 10, an electrode 66 electrically coupled to the mounting terminal 19 via an anisotropic conductive film or the like, while a terminal 69 such as a board-to-board connector is formed on an end portion at an opposite side from a side at which the wiring substrate 60 is electrically coupled with the first substrate 10. In addition, the wiring substrate 60 is mounted with a driving IC 50 at a position in the middle in the extending direction in which the wiring substrate 60 extends.

Electrical Configuration of Electro-Optical Device 1

Figure 2:
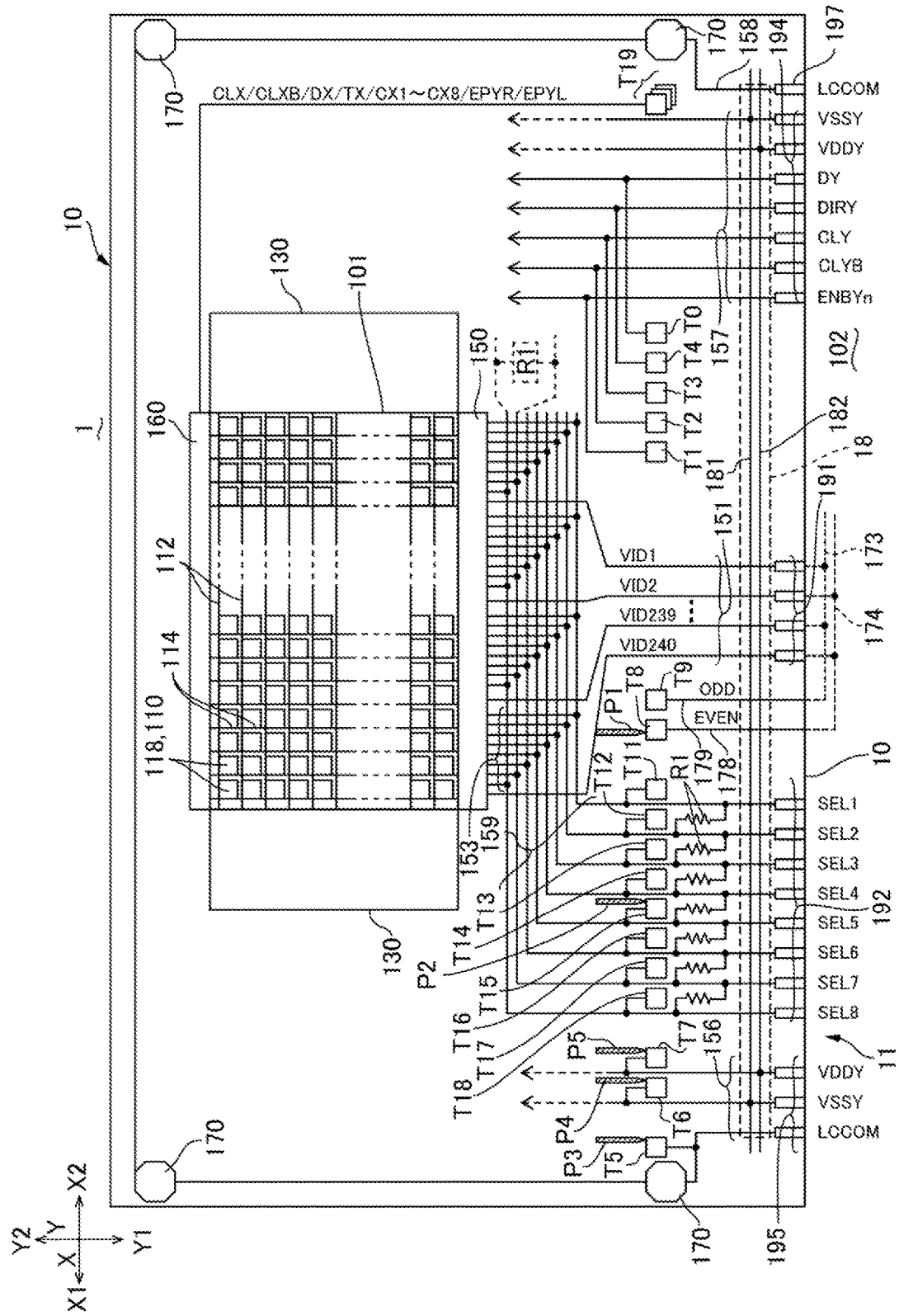
FIG. 2 is an explanatory diagram of an electrical configuration of an electro-optical device illustrated in FIG. 1.
Figure 3:
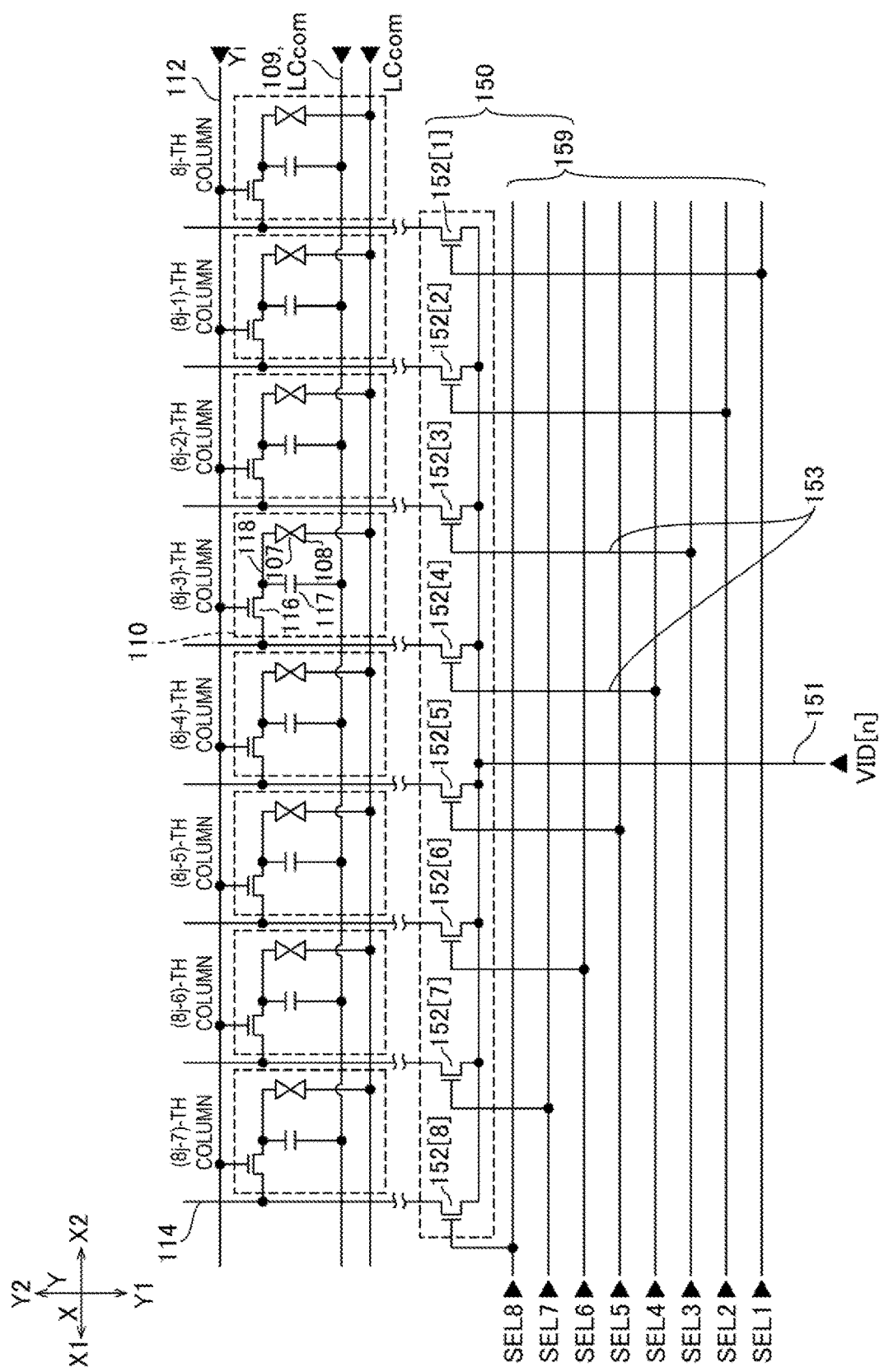
FIG. 3 is an explanatory diagram illustrating an electrical configuration of a pixel, a demultiplexer, and the like that are illustrated in FIG. 2.
Figure 4:
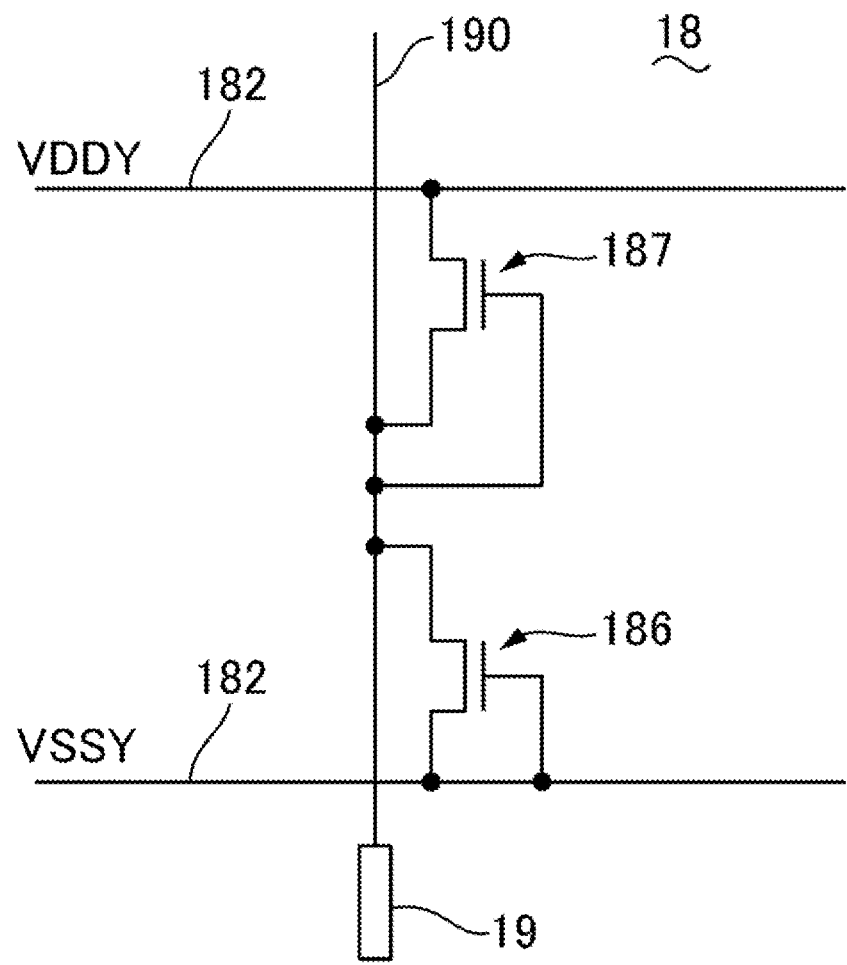
FIG. 4 is an explanatory diagram of an electrostatic protection circuit unit illustrated in FIG. 2.

FIG. 2 is an explanatory diagram illustrating an electrical configuration of the electro-optical device 1 illustrated in FIG. 1. FIG. 3 is an explanatory diagram illustrating an electrical configuration of the pixel 110, a demultiplexer 150, and the like that are illustrated in FIG. 2. FIG. 4 is an explanatory diagram of an electrostatic protection circuit 18 illustrated in FIG. 2.

As illustrated in FIG. 2, there are formed, at the first substrate 10, a plurality of columns of scanning lines 112 extending in the X-axis direction in the display region 101, and a plurality of columns of data lines 114 extending in the Y-axis direction in the display region 101, where the pixel 110 including the pixel electrode 118 is configured, corresponding to each of intersections between the plurality of columns of scanning lines 112 and the plurality of columns of data lines 114. The scanning line 112 is electrically coupled to scanning line driving circuits 130 provided on both sides in the X-axis direction of the display region 101. In Embodiment 1, the scanning line 112 is provided in m columns, and the data line 114 is provided in 1920 columns, for example.

As illustrated in FIG. 3, a plurality of the pixels 110 each include a pixel transistor 116 constituted by an N-channel type thin film transistor or the like. A gate of the pixel transistor 116 is electrically coupled to the scanning line 112 in an i-th row, a source of the pixel transistor 116 is electrically coupled to the data line 114 in a j-th column, and a drain of the pixel transistor 116 is electrically coupled to the pixel electrode 118 in the i-th row and in the j-th column, for example. The drain of the pixel transistor 116 and the pixel electrode 118 are electrically coupled to a capacitor line 109 via a storage capacitor 117. The capacitor line 109 is applied with a common potential LCCOM, for example. A common electrode 108 is formed at a surface facing the first substrate 10 of the second substrate 20, where the pixel electrode 118 configures a liquid crystal capacitor 107 between the pixel electrode 118 and the common electrode 108. The common electrode 108, which is common to all of the pixels 110, is applied with the common potential LCCOM.

In FIGS. 2 and 3, the plurality of columns of data lines 114 are grouped into n pieces of blocks for every plurality of columns, and a plurality of image signal wirings 151 each corresponding to each of a plurality of the blocks are provided, at a side in the Y1 direction of the display region 101, at the first substrate 10. The plurality of image signal wirings 151 are each electrically coupled to an image signal input terminal 191 (the mounting terminal 19). In Embodiment 1, an example is exemplified in which the plurality of columns of data lines 114 are grouped into blocks for every eight columns. Thus, the plurality of columns of data lines 114 are grouped into 240 pieces in total of blocks, and the number of the image signal wirings 151 is 240. The plurality of image signal wirings 151 are each supplied, when displaying an image, with image signals VID1 to VID240 via the image signal input terminal 191 from the driving IC 50 illustrated in FIG. 1.

In the first substrate 10, there is configured, at the side in the Y1 direction relative to the display region 101, the demultiplexer 150 configured to sequentially cause the data line 114 designated by eight types of selection signals SEL1 to SEL8 among eight columns of the data lines 114 that belong to each of the blocks to electrically conduct with the image signal wiring 151. The demultiplexer 150 includes a switching element 152 for switching interposed between the data line 114 and the image signal wiring 151 and eight pieces of selection signal supply wirings 159 configured to supply the selection signals SEL1 to SEL8 for controlling the switching element 152, where the eight pieces of selection signal supply wirings 159 are each electrically coupled to a selection signal input terminal 192 (the mounting terminal 19). The eight pieces of selection signal supply wirings 159 thus configured are each supplied, when displaying an image, with the selection signals SEL1 to SEL8 via the selection signal input terminal 192 from the driving IC 50 illustrated in FIG. 1.

The switching element 152 is provided at each of the plurality of columns of data lines 114. The switching element 152 serves as, for example, the N-channel type thin film transistor, in which the source is electrically coupled to the image signal wiring 151 and the drain is electrically coupled to the data line 114. Further, a gate of the switching element 152 is electrically coupled to the selection signal supply wiring 159 via a gate line 153. Here, the eight pieces of selection signal supply wirings 159 are electrically coupled to the gates of different switching elements 152 among eight pieces of the switching elements 152 each electrically coupled to each of eight pieces of the data lines 114 that belong to an identical block. For example, the selection signal supply wiring 159 configured to supply the selection signal SEL1 is electrically coupled to the gate of the switching element 152 electrically coupled to the data line 114 of the first one from a side in the X1 direction, which is one side in the X-axis direction, among the eight pieces of the data lines 114 that belong to one block. The selection signal supply wiring 159 configured to supply the selection signal SEL2 is electrically coupled to the gate of the switching element 152 electrically coupled to the data line 114 of the second one from the side in the X1 direction among eight pieces of the data lines 114 that belong to one block.

At the first substrate 10, there are provided, in the terminal region 11 at the side in the X1 direction from the selection signal input terminal 192, an input terminal 195 (the mounting terminal 19) to which the common potential LCCOM, a negative power source VSSY, and a positive power source VDDY are supplied from the wiring substrate 60, where a constant potential wiring 156 extends from the input terminal 195.

Further, in the terminal region 11, there are provided, at a side in the X2 direction, which is the other side in the X-axis direction from the image signal input terminal 191, an input terminal 194 (the mounting terminal 19) to which an enable signal ENBYn, clock signals CLY and CLYB, a direction signal DIRY, a transfer initiation pulse DY is input from the wiring substrate 60, and the input terminal 194 (the mounting terminal 19) to which the positive power source VDDY and the negative power source VSSY are input, where a wiring 157 extends from the input terminal 194. Note that there is provided, at an end portion on the second side X2 in the X-axis direction of the terminal region 11, an input terminal 197 (the mounting terminal 19) to which the common potential LCCOM is supplied from the wiring substrate 60, where a constant potential wiring 158 extends from the input terminal 197.

At the first substrate 10, there is formed an inter-substrate conduction electrode 170 for establishing electrical coupling with the second substrate 20 illustrated in FIG. 1, where the inter-substrate conduction electrode 170 is electrically coupled, via the constant potential wirings 156 and 158, to the input terminals 195 and 197 for the common potential.

At the first substrate 10, there are also provided, along the terminal region 11, two pieces of the wirings (a first protection circuit wiring 181 and a second protection circuit wiring 182) of the electrostatic protection circuit 18. The first protection circuit wiring 181 is electrically coupled with the constant potential wiring 156 and the wiring 157 for the negative power source VSSY, and the second protection circuit wiring 182 is electrically coupled with the constant potential wiring 156 and the wiring 157 for the positive power source VDDY.

As illustrated in FIG. 4, in the electrostatic protection circuit 18, a first transistor 186 is electrically coupled to a wiring 190 extending from the mounting terminal 19 and the first protection circuit wiring 181, and a second transistor 187 is electrically coupled to the wiring 190 and the second protection circuit wiring 182, for example. A gate of the first transistor 186 is electrically coupled to the first protection circuit wiring 181, and a gate of the second transistor 187 is electrically coupled to the wiring 190. Thus, when a surge current caused by static electricity enters into the wiring 190, the surge current can be caused to escape to the first protection circuit wiring 181 or the second protection circuit wiring 182.

Configuration of Inspection Circuit 160

Figure 5:
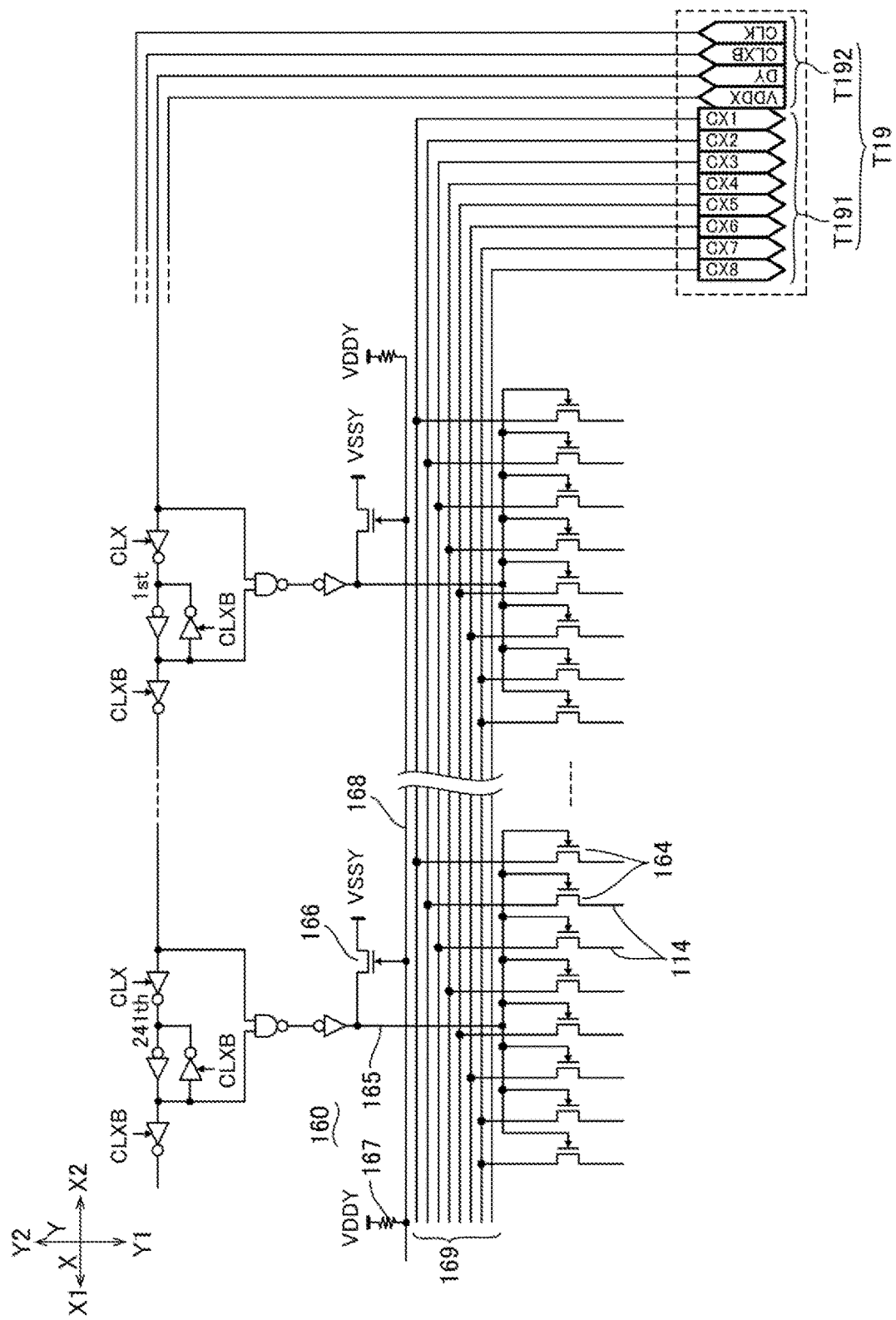
FIG. 5 is an explanatory diagram of an inspection circuit illustrated in FIG. 2.

FIG. 5 is an explanatory diagram of an inspection circuit 160 illustrated in FIG. 2. As illustrated in FIG. 2, at the first substrate 10, the inspection circuit 160 is configured at a side in the Y2 direction, which is at the other side in the Y-axis direction of the display region 101 (an opposite side of the display region 101 from the demultiplexer 150). In Embodiment 1, the inspection circuit 160 is configured to conduct inspection of each of the data lines 114 for every plurality of blocks.

More specifically, as illustrated in FIG. 5, the inspection circuit 160 includes n pieces of inspection wirings 169 and a plurality of switches 164 for inspection (inspection switches) electrically coupled at one end to each of the plurality of columns of data lines 114, where the other end of the plurality of switches 164 is electrically coupled to any one of the n pieces of inspection wirings 169. The switch 164 is, for example, the N-channel type thin film transistor in which the source (one end) of the source or the drain is electrically coupled to the data line 114, and the drain (the other end) is electrically coupled to the inspection wiring 169.

The inspection circuit 160 includes a shift register 162 configured to sequentially output a shift signal for simultaneously controlling eight pieces of the switches 164 that are electrically coupled to the data line 114 that belongs to each of the blocks, among the plurality of switches 164. The shift register 162 outputs a shift signal, via a shift signal supply wiring 165, to all of gates of the eight pieces of the switches 164 at the same time. The shift register 162 includes a clocked inverter, an inverter, a NAND circuit, and a NOT circuit at each of the stages.

Here, among the plurality of switches 164, the switches 164 electrically coupled at one end to the data lines 114 that belong to an identical block are each electrically coupled at the other end to a different inspection wiring 169. For example, in any of the blocks, the switch 164 electrically coupled at one end to the data line 114 of the first-located one from the side in the X2 direction is electrically coupled at the other end to the inspection wiring 169 configured to supply an inspection voltage Cx1 that will be described later, and the switch 164 electrically coupled at one end to the data line 114 of the second-located one from the side in the X2 direction is electrically coupled at the other end to the inspection wiring 169 configured to supply an inspection voltage Cx2 that will be described later.

The inspection circuit 160 includes a control wiring 168 extending in the X-axis direction between the shift register 162 and the inspection wiring 169, and a switch 166 for control that is electrically coupled to the shift signal supply wiring 165. The switch 166 is, for example, the N-channel type thin film transistor, where the source is electrically coupled to the negative power source VSSY, and the drain is electrically coupled to the shift signal supply wiring 165. The control wiring 168 is electrically coupled to a gate of the switch 166. The control wiring 168 is electrically coupled, via a resistance 167, to the positive power source VDDY.

Figure 6:
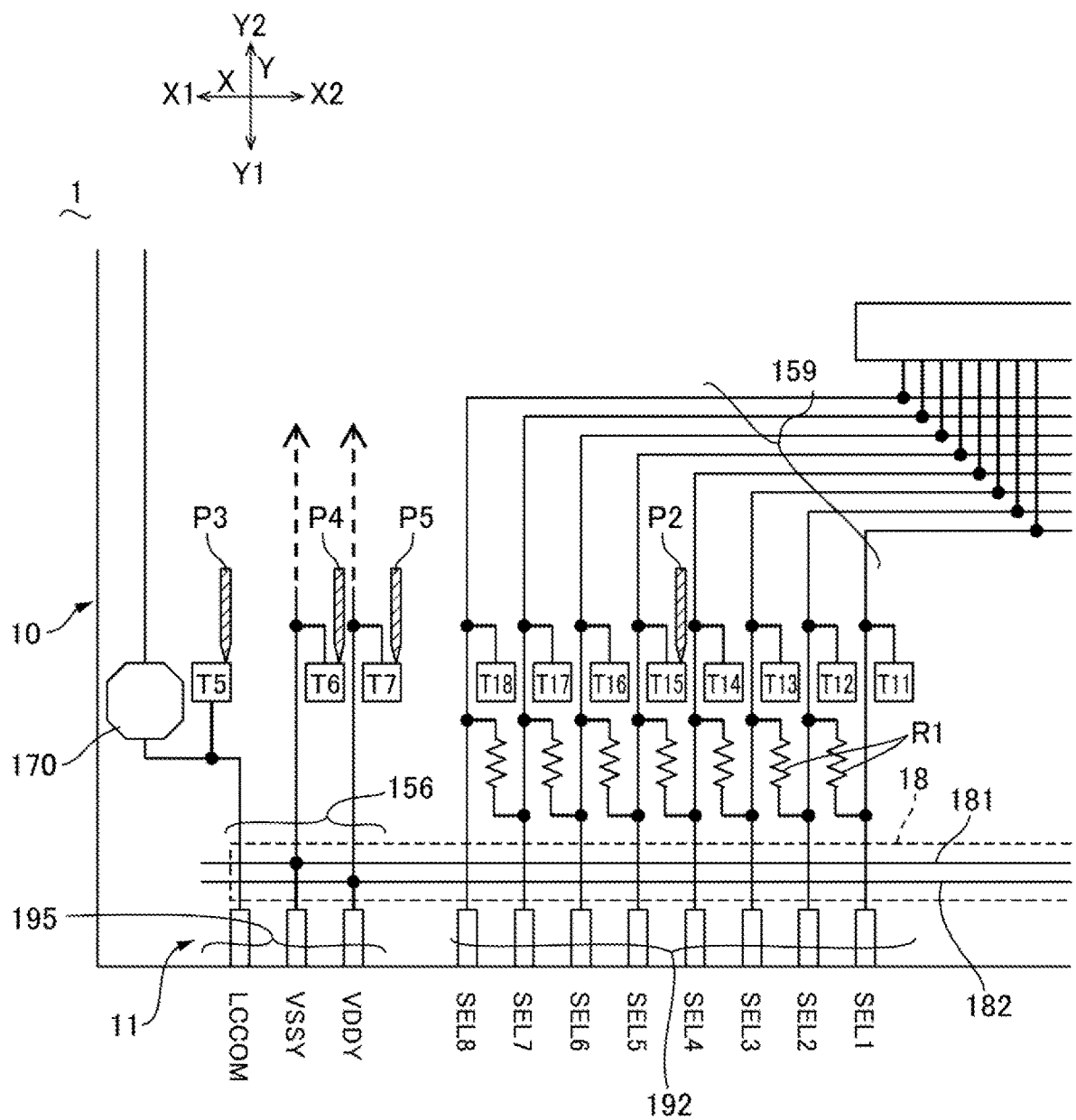
FIG. 6 is an explanatory diagram illustrating, in an enlarged manner, a periphery of a selection signal supply wiring illustrated in FIG. 2.

Configuration of Inspection Terminal and the Like FIG. 6 is an explanatory diagram illustrating, in an enlarged manner, a periphery of the selection signal supply wiring 159 illustrated in FIG. 2. In Embodiment 1, the first substrate 10 illustrated in FIG. 2 and the like is manufactured in a state of being a large-scale substrate. In addition, an electrical inspection is conducted before dividing the large-scale substrate into the first substrates 10. Accordingly, an inspection terminal and the like described below are provided in a region, of the large-scale substrate, which is to be divided as the first substrate 10.

First, as illustrated in FIG. 2, in the wiring 157, inspection terminals T0 to T4 are each electrically coupled to each of five pieces of signal lines. Further, an inspection terminal T19 is electrically coupled to each of a plurality of wirings extending from the inspection circuit 160. As illustrated in FIG. 5, the inspection terminal T19 includes an inspection terminal T191 for supplying inspection voltages CX1 to CX8 to the inspection wiring 169 and an inspection terminal T192 for supplying a positive power source VDDX, the transfer initiation pulse DY, and the clock signals CLK and CLKB to the shift register 162. Note that the negative power source VSSY of the shift register 162 is supplied from an inspection terminal T6 that will be described later.

Referring back to FIG. 2, in Embodiment 1, there are formed, in a removal material region 102 outside the region, of the large-scale substrate, which is to be divided as the first substrate 10, a first inspection auxiliary wiring 173 electrically coupled with the image signal wiring 151 of an odd-numbered one from an X2 direction side, and a second inspection auxiliary wiring 174 coupled with the image signal wiring 151 of an even-numbered one is electrically coupled, among the plurality of image signal wirings 151. Further, there are formed, in the region that is to be divided as the first substrate 10, an inspection terminal T8 electrically coupled to a wiring 178 extending from the second inspection auxiliary wiring 174, and an inspection terminal T9 electrically coupled to a wiring 179 extending from the first inspection auxiliary wiring 173. The first inspection auxiliary wiring 173 and the second inspection auxiliary wiring 174 thus formed are separated from the first substrate 10 when the large-scale substrate is divided.

In Embodiment 1, as illustrated in FIG. 6 in an enlarged manner, there are formed, at the first substrate 10, an inspection terminal T5 electrically coupled to the constant potential wiring 156 for the common potential LCCOM, the inspection terminal T6 electrically coupled to the constant potential wiring 156 for the negative power source VSSY, and an inspection terminal T7 electrically coupled to the constant potential wiring 156 for the positive power source VDDY.

Moreover, there are formed, at the first substrate 10, eight pieces of inspection terminals T11 to T18 each electrically coupled to each of the eight pieces of selection signal supply wirings 159.

Furthermore, there are formed, at the first substrate 10, seven pieces in total of resistance members R1 for electrically coupling the selection signal supply wirings 159 adjacent to each other among the eight pieces of selection signal supply wirings 159. The resistance member R1 is composed of a resistance film formed at the first substrate 10, where a resistance value of the resistance member R1 ranges approximately from several 100 kΩ to several MΩ, for example. In Embodiment 1, in the selection signal supply wiring 159, the resistance member R1 is electrically coupled to a location between the selection signal input terminal 192 and a position to which the inspection terminals T11 to T18 are electrically coupled. Thus, in conducting an inspection, the probe can be brought into contact with each of the inspection terminals T11 to T18 to supply a selection signal for inspection to each of the eight pieces of selection signal supply wirings 159. Further, as illustrated in FIG. 2, a probe P2 can be brought into contact with the inspection terminal T15 to supply a selection signal to all in total of the eight pieces of selection signal supply wirings 159.

Note that the resistance member R1 may be configured to be electrically coupled with the selection signal supply wirings 159 adjacent at an end portion in the side in the X2 direction of the selection signal supply wiring 159 extending in the X2 direction. The illustration by a dashed line portion in FIG. 2 indicates one example of a modified example in such a case, where the resistance member R1 for electrically coupling the selection signal supply wiring 159 corresponding to the selection signal SEL7 with the selection signal supply wiring 159 corresponding to the selection signal SEL8 is selectively illustrated. According to such a configuration, in conducting an inspection, when, for example, applying a high electrical potential to the inspection terminal T11 and applying a low electrical potential to the inspection terminal T12, an inspection of conduction (disconnection) can also be conducted by detecting a current flowing via the selection signal supply wiring 159 of the selection signal SEL1, the resistance member R1, and the selection signal supply wiring 159 of the selection signal SEL2.

Inspection Process of First Substrate 10

In a process for manufacturing the electro-optical device 1 illustrated in FIG. 1, the data line 114, the scanning line 112, the scanning line driving circuit 130, the demultiplexer 150, and the like that are illustrated in FIG. 2 are formed on the large-scale substrate from which the first substrates 10 are divided and then an inspection process is conducted on the data line 114 and the like. Thus, when conducting an inspection process, the wiring substrate 60 on which the driving IC 50 is mounted is not electrically coupled to the first substrate 10. Then, the second substrate 20 is affixed to the large-scale substrate that has undergone the inspection process, and thereafter, the large-scale substrate is divided into the first substrates 10 of a single-product size.

Inspection Method 1

Next, a method for inspecting a disconnection of the data line 114 using the inspection circuit 160 will be described. First, a probe card is used to cause a probe to be brought into contact with all of the inspection terminals, and an electrical power source or signal is applied to all of the inspection terminals. At this time, a selection signal for turning on the switching element 152 is applied to all of the selection signal supply wirings 159. Next, the shift register 162 is caused to sequentially select a data line block composed of the eight pieces of the data lines 114. When a potential difference is applied between the inspection terminal T18 or T19 and the inspection terminal T191, a current flows through the data line 114 on the condition that there is no disconnection in the data line 114, to thus enable an inspection of the disconnection of the data line 114.

Inspection Method 2

Next, a method for inspecting a short-circuit fault between the data line 114 and the capacitor line 109 using the inspection circuit 160 will be described. First, the probe card is used to cause the probe to be brought into contact with all of the inspection terminals, and the electrical power source or signal is applied to all of the inspection terminals. At this time, the selection signal for turning on the switching element 152 is applied to all of the selection signal supply wirings 159. The selection signal supply wiring 159 of the shift register 162 makes all of the data lines 114 unselected. For simplification, it suffices that the positive power source VDDX be High-Z. When a potential difference is applied between the inspection terminal T18 or T19 and the inspection terminal T5 (LCCOM), a current flows on the condition that there is a short-circuited portion between the data line 114 and the capacitor line 109, to thus enable an inspection of whether a short-circuit fault is present between the data line 114 and the capacitor line 109. However, this result cannot be used to identify a specific location of the short-circuited portion. Thus, a failure location analysis needs to be conducted. A failure location is specified, and a cross-sectional analysis or the like is used to specify a failure process, to thus improve the yield ratio.

Other Inspection Methods

Note that the short-circuit fault in the image signal wirings 151 adjacent can be inspected when detecting a current flowing between the inspection terminals T8 and T9 in a state where a selection signal of OFF is being supplied to all of the selection signal supply wirings 159.

Failure Location Analysis Method

When analyzing the short-circuit fault between the data line 114 and the capacitor line 109, a probe P1 is brought into contact with the inspection terminal T8 to apply an analysis potential to the image signal wiring 151 of an even-numbered one from the side in the X2 direction, while the probe P2 is brought into contact with the inspection terminal T15 to apply the selection signal for turning on the switching element 152 to all of the selection signal supply wirings 159. This allows the analysis potential to be applied to the data line 114 that belongs to an even-numbered block from the side in the X2 direction. Further, a probe P3 is brought into contact with the inspection terminal T5 to apply the common potential LCCOM to the capacitor line 109 via the constant potential wiring 156 for the common potential LCCOM. Then, a camera is used to image-capture the display region 101. Here, infrared light is emitted from a short-circuited location when a short-circuit fault is present between the data line 114 that belongs to an even-numbered block from the X2 direction side and the capacitor line 109, which makes it possible to confirm a presence or absence of the short-circuit fault, or the short-circuited location from the image-capturing result of the camera.

From this state, the probe P1 is brought into contact with the inspection terminal T9 to apply the analysis potential to the image signal wiring 151 of an odd-numbered one from the side in the X2 direction. This allows the analysis potential to be applied to the data line 114 that belongs to an odd-numbered block from a direction of the X2 direction side. Then, the camera is used to image-capture the display region 101. Here, infrared light is emitted from the short-circuited location when the short-circuit fault is present between the data line 114 that belongs to an odd-numbered block from the X2 direction side and the capacitor line 109, which makes it possible to confirm a presence or absence of the short-circuit fault, or the short-circuited location from the image-capturing result of the camera.

When conducting the above-described analysis, a probe P4 is brought into contact with the inspection terminal T6 electrically coupled to the constant potential wiring 156 for the negative power source VSSY, and a probe P5 is brought into contact with the inspection terminal T7 electrically coupled to the constant potential wiring 156 for the positive power source VDDY. Note that a signal related to the scanning line driving circuit 130 may be a floating signal.

As such, in Embodiment 1, the resistance member R1 for electrically coupling the selection signal supply wirings 159 adjacent to each other is formed at the first substrate 10, thus, a plurality of the selection signal supply wirings 159 are electrically coupled via the resistance member R1. Thus, without causing the probe to be brought into contact with each of the plurality of inspection terminals T11 to T18, the probe P2 can be brought into contact with the inspection terminal T15 to supply the selection signal for analysis that is common to the plurality of the selection signal supply wirings 159. That is, the number of the probes required for the analysis is reduced. Thus, when conducting an analysis based on a result of image-capturing the display region 101, a situation is prevented from occurring in which a part of the display region 101 is hidden by the probe, for example.

Display Operation

Figure 7:
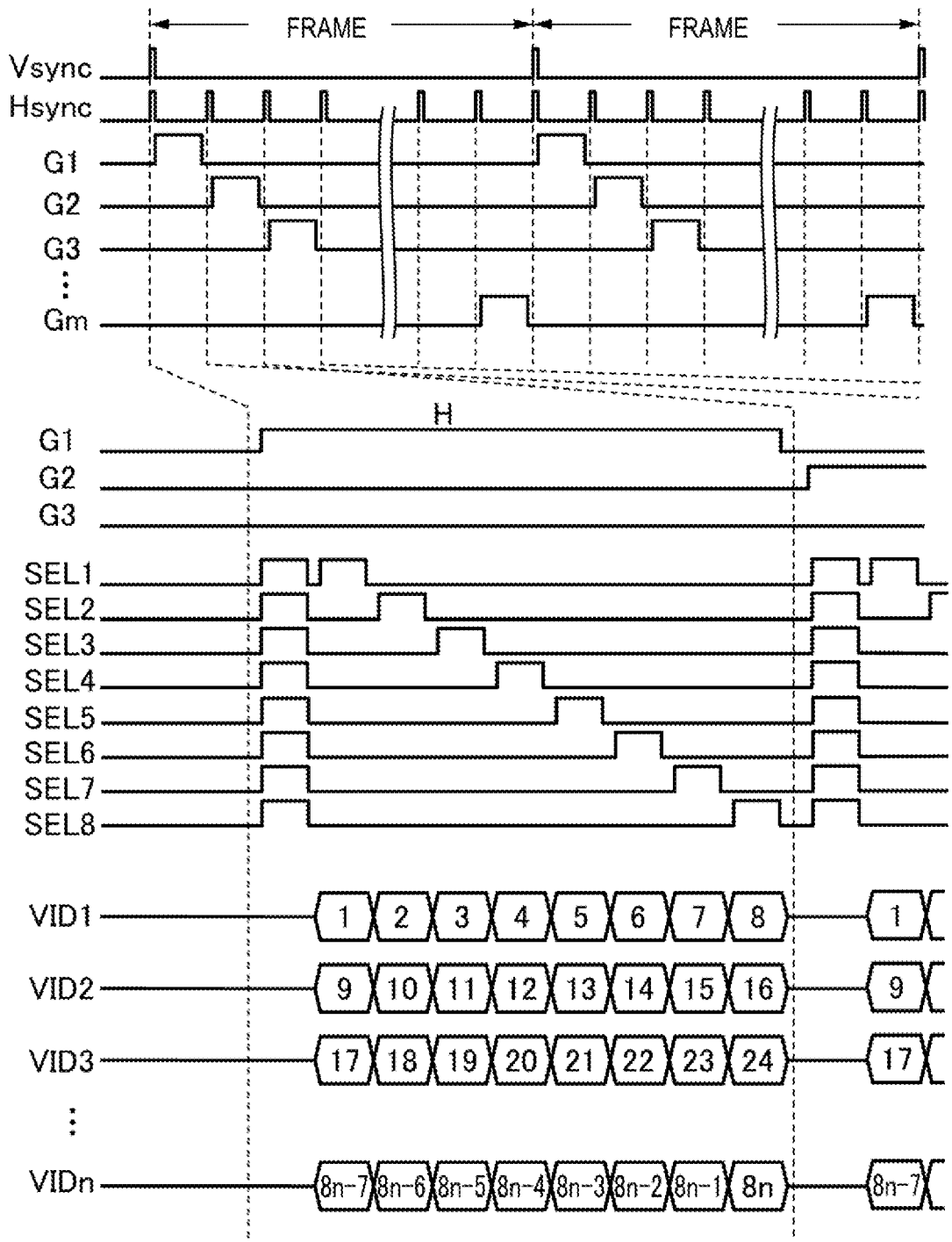
FIG. 7 is a timing chart when performing a display by an electro-optical device illustrated in FIG. 1.

FIG. 7 is a timing chart when performing a display by the electro-optical device 1 illustrated in FIG. 1. When performing displaying at the electro-optical device 1, the wiring substrate 60 on which the driving IC 50 is mounted is electrically coupled to the first substrate 10, as illustrated in FIG. 1. In this state, the positive power source VDDX is High-Z. However, the positive power source VDDY is constantly supplied through the resistance 167 to the control wiring 168, thus making the switch 166 in a full-time ON state. Thus, the shift signal supply wiring 165 of the shift register 162 is applied with the negative power source VSSY, thus resolving a floating state. Also, all of the switches 164 are in an OFF state, thus, the inspection circuit 160 is electrically isolated from the display region 101.

As illustrated in FIG. 7, when performing a display by the electro-optical device 1, the scanning line driving circuit 130, within one frame (N frame) period, which is defined by a horizontal synchronizing signal Hsync that is synchronized with a vertical synchronizing signal Vsync, causes scan signals G1, G2, G3, . . . , and G1200 to be sequential exclusively at an H level in every period H. During the period H, the selection signals SEL1, SEL2, SEL3, SEL4, SEL5, SEL6, SEL7, SEL8, and SEL8 are sequential exclusively at the H level, and the image signal wiring 151, in synchronization with the selection signals SEL1, SEL2, SEL3, SEL4, SEL5, SEL6, SEL7, and SEL8, supplies image signals VID1, VID2, . . . , and VID240 that contain an image signal. Thus, for example, in case where the selection signal SEL1 is at the H level during a period in which the scanning signal G1 is at the H level, data contained in the image signals VID1, VID2, . . . , and VID240 are written to the pixel 110 corresponding to an intersection between the scanning line 112 in the first column, and the data line 114 of the first-located one from the side in the X2 direction at each of the plurality of the blocks.

Next, when the selection signal SEL2 is at the H level, data contained in the image signals VID1, VID2, . . . , and VID240 are written to the pixel 110 corresponding to an intersection between the scanning line 112 in the first column, and the data line 114 of the second-located one from the X2 direction side, at each of the plurality of the blocks. When the selection signals SEL3 to SEL8 reach the H level, a similar writing procedure of the data is performed.

Note that during the period H, a pre-charge period is provided in which the selection signals SEL1 to SEL8 simultaneously reach the H level.

A similar operation to such an operation is performed during the period in which the scan signals G2, G3, . . . , and Gn sequentially reach the H level. Further, a similar writing procedure is performed in a subsequent frame as well. At that time, there may be a case when a polarity written into each of the pixels 110 is reversed. That is, supposing that positive polarity writing has been performed in the immediately preceding N frame, negative polarity writing is to be performed in the subsequent (N+1) frame, while supposing that the negative polarity writing has been performed in the immediately preceding N frame, the positive polarity writing is to be performed in the subsequent (N+1) frame. Performing such a polarity reversal prevents a deterioration of the liquid crystal layer.

When performing such a display operation, there are formed, at the first substrate 10, seven pieces in total of the resistance members R1 for electrically coupling the selection signal supply wirings adjacent to each other among the eight pieces of selection signal supply wirings 159, where the resistance value of the resistance member R1 is sufficiently large. This makes it possible to properly supply each of the selection signals SEL1 to SEL8 to each of the eight pieces of selection signal supply wirings 159, thus enabling to perform the display operation in a suitable manner.

Embodiment 2

Figure 8:
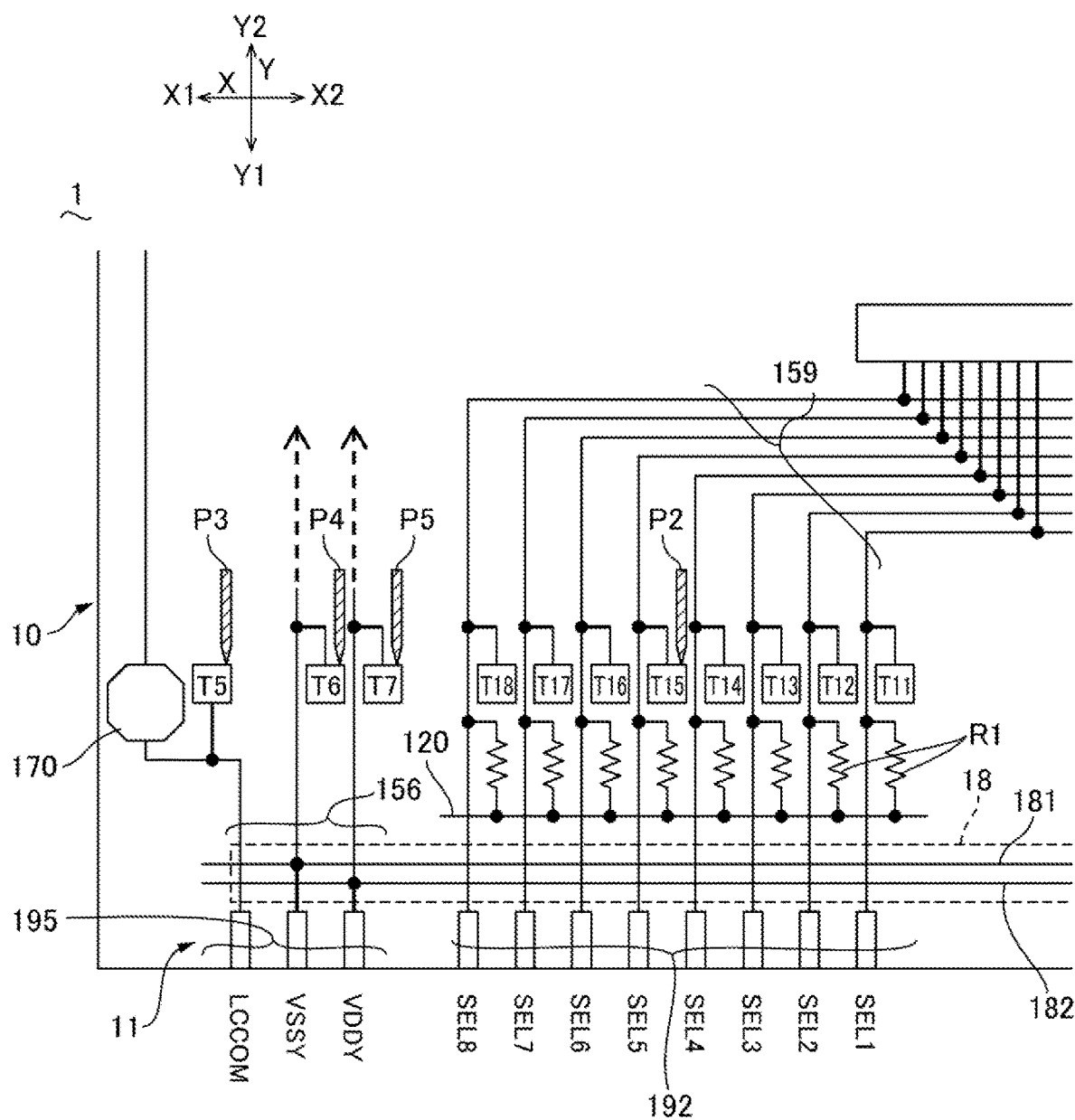
FIG. 8 is an explanatory diagram of an electro-optical device according to Embodiment 2 of the present disclosure.

FIG. 8 is an explanatory diagram of the electro-optical device 1 according to Embodiment 2 of the present disclosure, which is an explanatory diagram illustrating, in an enlarged manner, a periphery of the selection signal supply wiring 159. Note that the basic configuration of both Embodiment 2 and embodiments that will be described later is the same as that of Embodiment 1, and thus common parts will be denoted by identical reference signs and description of the parts will be omitted.

As illustrated in FIG. 8, there are formed, at the first substrate 10, the eight pieces of inspection terminals T11 to T18 each electrically coupled to each of the eight pieces of selection signal supply wirings 159. In addition, there is formed, at the first substrate 10, the resistance member R1 for electrically coupling the selection signal supply wirings 159 adjacent to each other among the eight pieces of selection signal supply wirings 159. In Embodiment 2, the first substrate 10 is provided with a common wiring 120 extending in the X-axis direction between the position to which the inspection terminals T11 to T18 are electrically coupled to the selection signal supply wiring 159 and the selection signal input terminal 192, where each of the plurality of the selection signal supply wirings 159 is electrically coupled to the common wiring 120 via the resistance member R1. Thus, the selection signal supply wirings 159 adjacent are electrically coupled to each other via the resistance member R1 and the common wiring 120. Even with such a configuration, all of the eight pieces in total of the selection signal supply wirings 159 can be supplied with the selection signal, when, for example, the probe P2 is brought into contact with the inspection terminal T15 to apply the selection signal for analysis. Further, the plurality of the selection signal supply wirings 159 are each electrically coupled to the common wiring 120 via the resistance member R1, thus improving an identity of the selection signal supplied, when performing normal display, to the plurality of the selection signal supply wirings 159, resulting in a suppression of a display unevenness.

Embodiment 3

Figure 9:
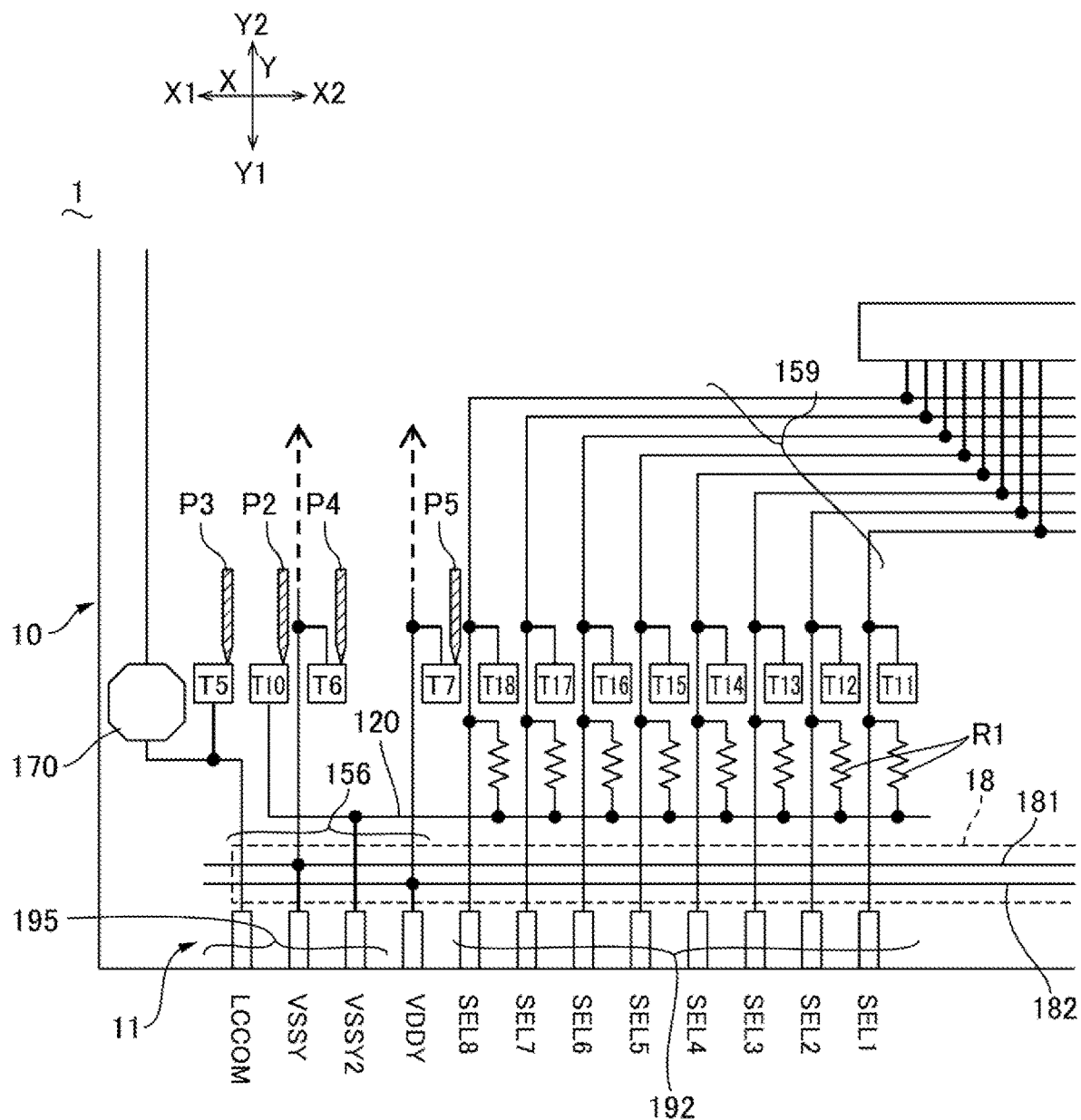
FIG. 9 is an explanatory diagram of an electro-optical device according to Embodiment 3 of the present disclosure.

FIG. 9 is an explanatory diagram of the electro-optical device 1 according to Embodiment 3 of the present disclosure, and is an explanatory diagram illustrating, in an enlarged manner, the periphery of the selection signal supply wiring 159 illustrated in FIG. 2. As illustrated in FIG. 9, the first substrate 10 is provided with the eight pieces of inspection terminals T11 to T18 each electrically coupled to each of the eight pieces of selection signal supply wirings 159. The first substrate 10 is also provided with the common wiring 120 extending in the X-axis direction, where the common wiring 120 is electrically coupled, via the resistance member R1, with each of the plurality of the selection signal supply wirings 159. The first substrate 10 is further provided with an inspection terminal T10 electrically coupled to the common wiring 120. Thus, all of the eight pieces in total of the selection signal supply wirings 159 can be supplied with the selection signal, when the probe P2 is brought into contact with the inspection terminal T10 to apply a selection signal. In addition, the inspection terminal T10 is electrically coupled to the common wiring 120, thus improving the identity of the selection signal supplied, when performing normal display, to the plurality of the selection signal supply wirings 159. Further, the inspection terminal T10 is electrically coupled to the common wiring 120, thus, the inspection terminal T10 can be separated from the display region 101, as well as the other inspection terminals T5 to T7 can also be provided at close positions. Thus, when performing analysis operation, the probes P2 to P5 can be intensively used, to thus allow all of the probes to be viewed within a visual field of a magnifying viewer in an analyzer, which facilitates a probing operation.

In Embodiment 3, the first substrate 10 is provided with the input terminal 195 for another negative power source VSSY2 in addition to the input terminal 195 for the negative power source VSSY, where the input terminal 195 for the negative power source VSSY2 is electrically coupled with the common wiring 120 via the constant potential wiring 156. This makes it possible to fix an electrical potential of the common wiring 120, thus enabling to suppress an unintended noise from superimposing on the selection signal supply wiring 159 when performing the display operation. This results in a suppression of the display unevenness. It is preferred that the negative power source VSSY2 be provided with an electrical potential equal to that of the negative power source VSSY.

The input terminal 195 for the negative power source VSSY is adjacent to the input terminal 195 for the negative power source VSSY2, thus, a layout of the wirings at the wiring substrate 60 can be simplified on the condition that the negative power source VSSY2 is equal in electrical potential to the negative power source VSSY. Note that a dummy terminal may be provided between the input terminal 195 for the electrical power source VSSY and the input terminal 195 for the negative power source VSSY2.

Embodiment 4

Figure 10:
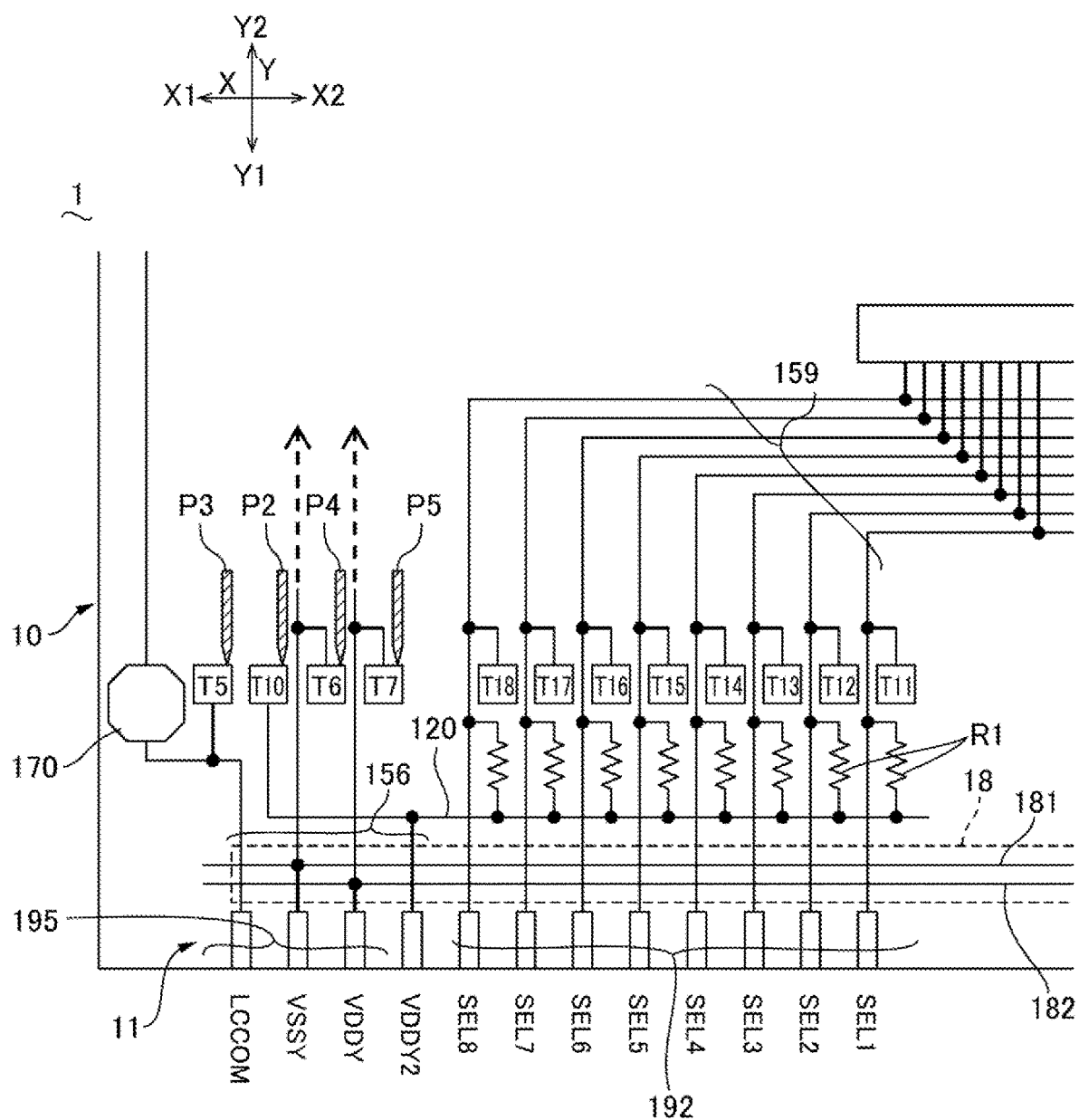
FIG. 10 is an explanatory diagram of an electro-optical device according to Embodiment 4 of the present disclosure.

FIG. 10 is an explanatory diagram of the electro-optical device 1 according to Embodiment 4 of the present disclosure, which is an explanatory diagram illustrating, in an enlarged manner, the periphery of the selection signal supply wiring 159 in FIG. 2. As illustrated in FIG. 10, the first substrate 10 is provided with the eight pieces of inspection terminals T11 to T18 each electrically coupled to each of the eight pieces of selection signal supply wirings 159. The first substrate 10 is also provided with the common wiring 120 extending in the X-axis direction, where the common wiring 120 is electrically coupled, via the resistance member R1, with each of the plurality of the selection signal supply wirings 159. Thus, the selection signal supply wirings 159 adjacent are electrically coupled to each other via the resistance member R1 and the common wiring 120. The first substrate 10 is further provided with the inspection terminal T10 electrically coupled to the common wiring 120.

Here, the first substrate 10 is provided with the input terminal 195 for the other positive power source VDDY2 in addition to the input terminal 195 for a positive power source VDDY, where the input terminal 195 for the positive power source VDDY2 is electrically coupled with the common wiring 120 via the constant potential wiring 156. In Embodiment 4, the input terminal 195 for the positive power source VDDY is adjacent to the input terminal 195 for the positive power source VDDY2, thus, the layout of the wirings at the wiring substrate 60 can be simplified on the condition that the positive power source VDDY2 is equal in electrical potential to the positive power source VDDY. Note that a dummy terminal may be provided between the input terminal 195 for the positive power source VDDY and the input terminal 195 for the positive power source VDDY2.

Embodiment 5

Figure 11:
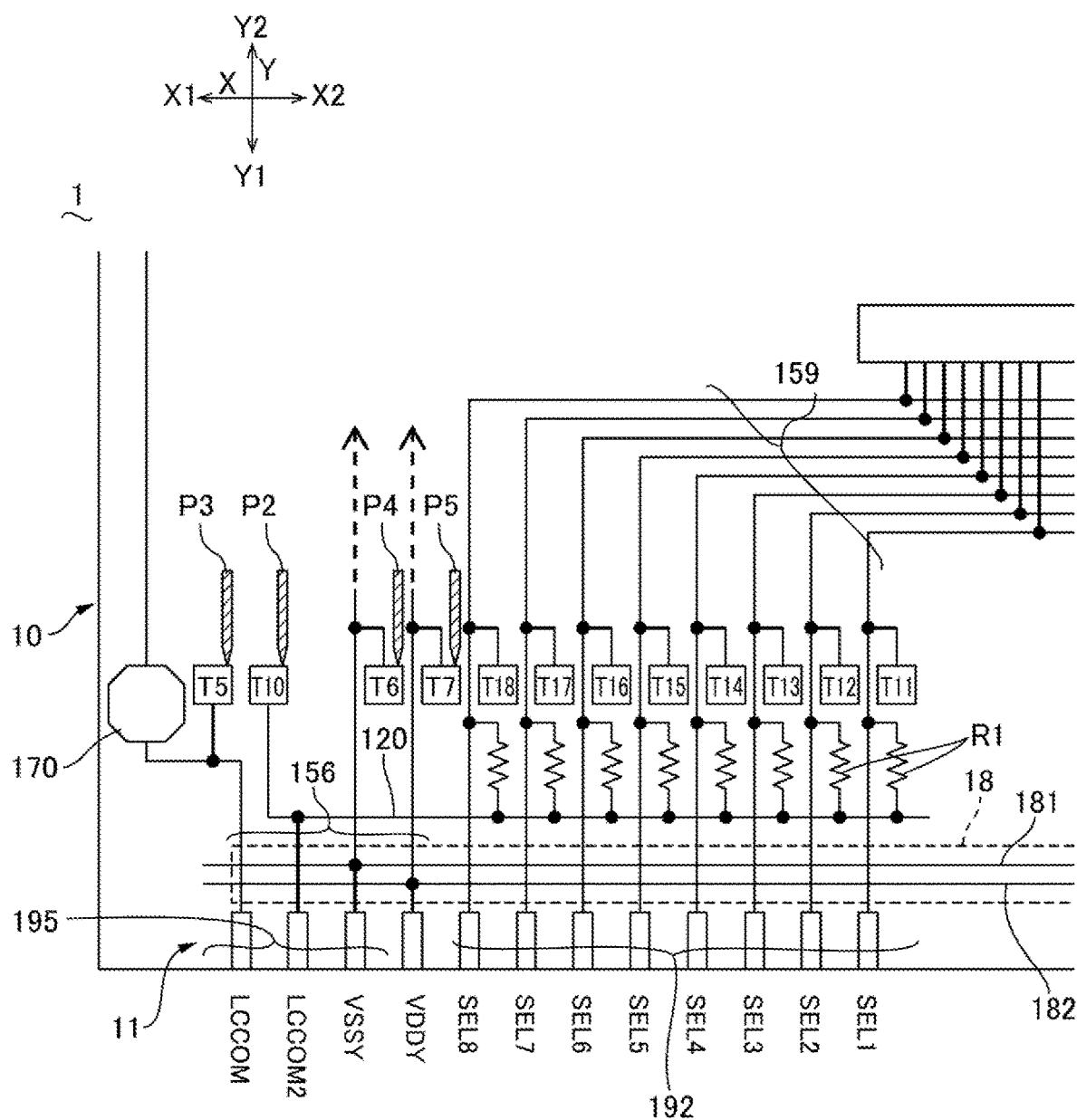
FIG. 11 is an explanatory diagram of an electro-optical device according to Embodiment 5 of the present disclosure.

FIG. 11 is an explanatory diagram of the electro-optical device 1 according to Embodiment 5 of the present disclosure, and is an explanatory diagram illustrating, in an enlarged manner, the periphery of the selection signal supply wiring 159 in FIG. 2. As illustrated in FIG. 11, the first substrate 10 is provided with the eight pieces of inspection terminals T11 to T18 each electrically coupled to each of the eight pieces of selection signal supply wirings 159. The first substrate 10 is also provided with the common wiring 120 extending in the X-axis direction, where the common wiring 120 is electrically coupled, via the resistance member R1, with each of the plurality of the selection signal supply wirings 159. Thus, the selection signal supply wirings 159 adjacent are electrically coupled to each other via the resistance member R1 and the common wiring 120.

Here, the first substrate 10 is provided with the input terminal 195 for another common potential LCCOM2 in addition to the input terminal 195 for the common potential LCCOM, where the input terminal 195 for the common potential LCCOM2 is electrically coupled with the common wiring 120 via the constant potential wiring 156. In Embodiment 5, the input terminal 195 for the common potential LCCOM is adjacent to the input terminal 195 for the common potential LCCOM2, thus, the layout of the wirings at the wiring substrate 60 can be simplified on the condition that the common potential LCCOM2 is equal in electrical potential to the common potential LCCOM. Note that a dummy terminal may be provided between the input terminal 195 for the common potential LCCOM and the input terminal 195 for the common potential LCCOM2.

Embodiment 6

Figure 12:
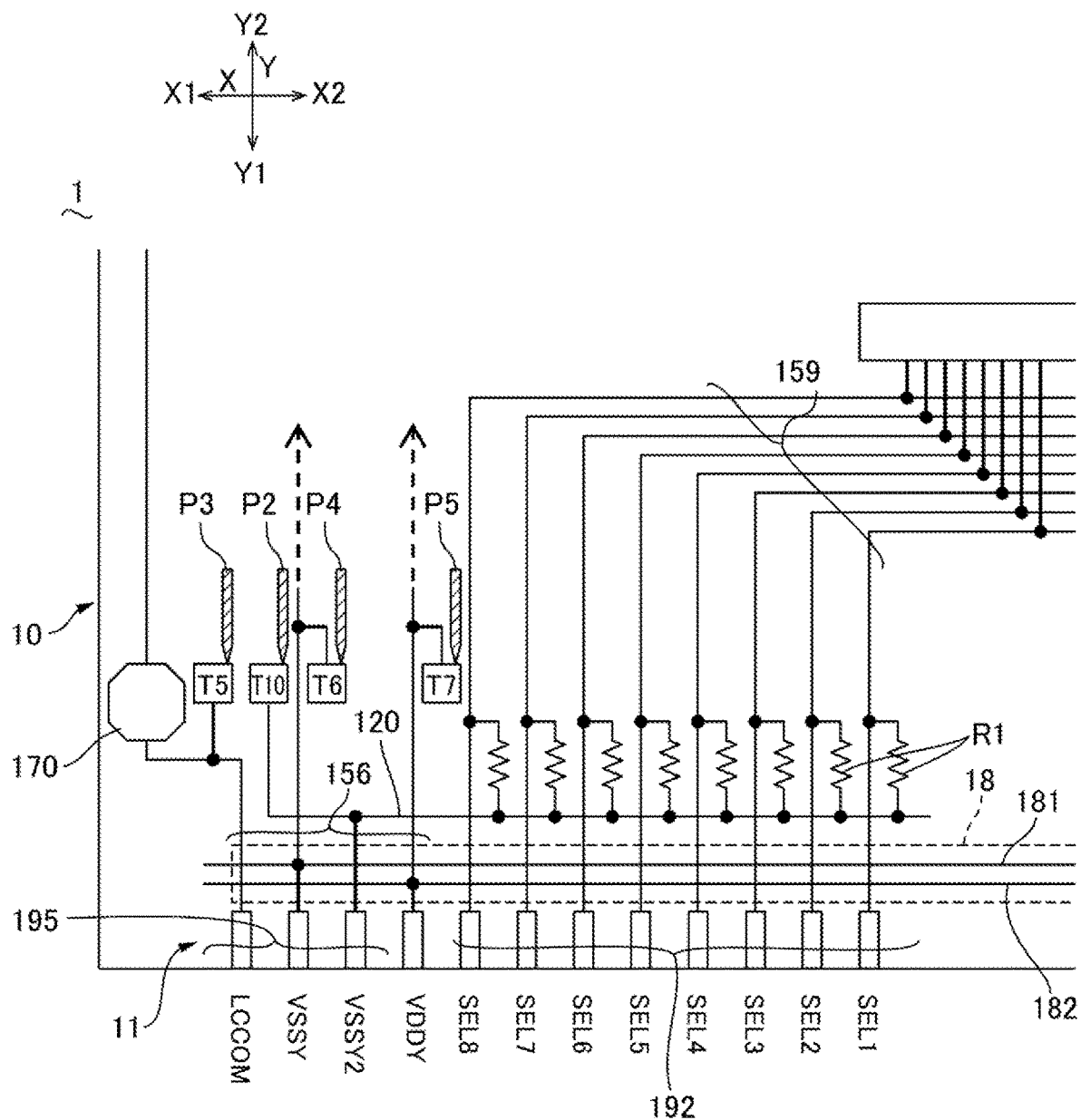
FIG. 12 is an explanatory diagram of an electro-optical device according to Embodiment 6 of the present disclosure.

FIG. 12 is an explanatory diagram of the electro-optical device 1 according to Embodiment 6 of the present disclosure, and is an explanatory diagram illustrating, in an enlarged manner, the periphery of the selection signal supply wiring 159 in FIG. 2. As illustrated in FIG. 9, the first substrate 10 is provided with the common wiring 120 extending in the X-axis direction, where the common wiring 120 is electrically coupled, via the resistance member R1, with each of the plurality of the selection signal supply wirings 159. Thus, the selection signal supply wirings 159 adjacent are electrically coupled to each other via the resistance member R1 and the common wiring 120. The first substrate 10 is also provided with the inspection terminal T10 electrically coupled to the common wiring 120. Thus, all of the eight pieces in total of the selection signal supply wirings 159 can be supplied with the selection signal, when the probe P2 is brought into contact with the inspection terminal T10 to apply a selection signal.

Here, the first substrate 10 is provided with the input terminal 195 for the other negative power source VSSY2 in addition to the input terminal 195 for the negative power source VSSY, where the input terminal 195 for the negative power source VSSY2 is electrically coupled with the common wiring 120 via the constant potential wiring 156.

In Embodiment 6, there are not formed the eight pieces of inspection terminals T11 to T18 (see FIG. 8) each electrically coupled to each of the eight pieces of selection signal supply wirings 159. This makes it possible to reduce a capacity load on the selection signal supply wiring 159, and additionally, a space occupied by the inspection terminals T11 to T18 becomes unnecessary, thus making the first substrate 10 compact. Even in this case, the inspection method 1 described above can be used to conduct inspection of the disconnection of the data line 114.

Embodiment 7

Figure 13:
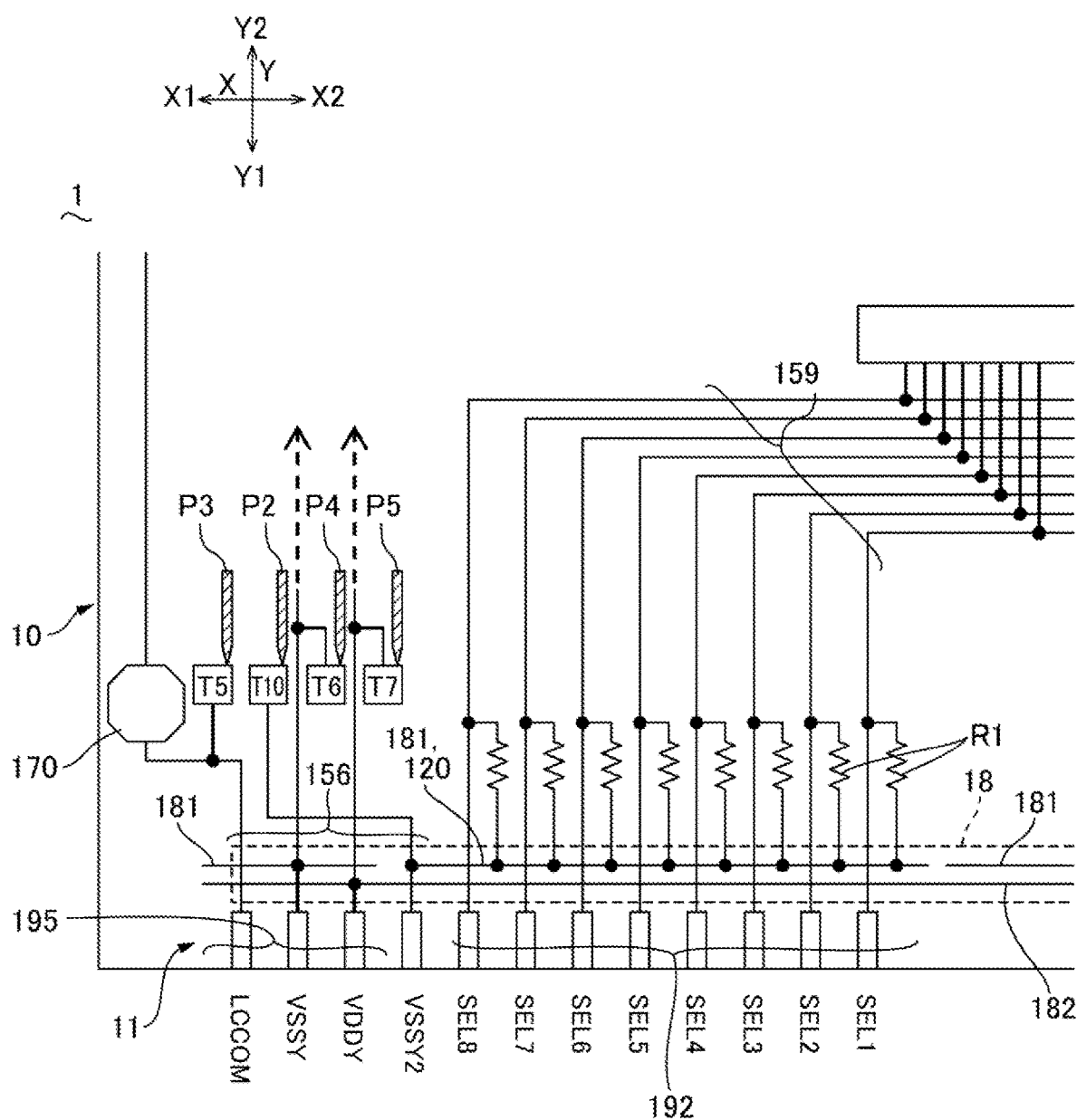
FIG. 13 is an explanatory diagram of an electro-optical device according to Embodiment 7 of the present disclosure.

FIG. 13 is an explanatory diagram of the electro-optical device 1 according to Embodiment 7 of the present disclosure, and is an explanatory diagram illustrating, in an enlarged manner, the periphery of the selection signal supply wiring 159 in FIG. 2. As illustrated in FIG. 13, the first substrate 10 is provided with the input terminal 195 for the other negative power source VSSY2 in addition to the input terminal 195 for the negative power source VSSY, where the input terminal 195 for the negative power source VSSY2 is electrically coupled with the first protection circuit wiring 181 via the constant potential wiring 156. The first protection circuit wiring 181 is divided in the middle, and the plurality of the selection signal supply wirings 159 are each electrically coupled to a part (the common wiring 120) of the first protection circuit wiring 181 via the resistance member R1, where the part is electrically coupled to the input terminal 195 for the negative power source wiring VSSY2.

Even with such a configuration, the selection signal supply wirings 159 adjacent are electrically coupled to each other via the resistance member R1 and the first protection circuit wiring 181 (the common wiring 120). The first substrate 10 is also provided with the inspection terminal T10 electrically coupled to the first protection circuit wiring 181. Thus, all of the eight pieces in total of the selection signal supply wirings 159 can be supplied with the selection signal, when the probe P2 is brought into contact with the inspection terminal T10 to apply a selection signal. In addition, the common wiring 120 also serves as the first protection circuit wiring 181, which makes it possible to achieve an efficient layout. Note that the first protection circuit wiring 181 is divided into pieces that are electrically coupled to each other within the first substrate 10.

In Embodiment 7, there are not formed the eight pieces of inspection terminals T11 to T18 (see FIG. 8) each electrically coupled to each of the eight pieces of selection signal supply wirings 159. Even in this case, the inspection method 1 described above can be used to conduct inspection of the disconnection of the data line 114.

Embodiment 8

Figure 14:
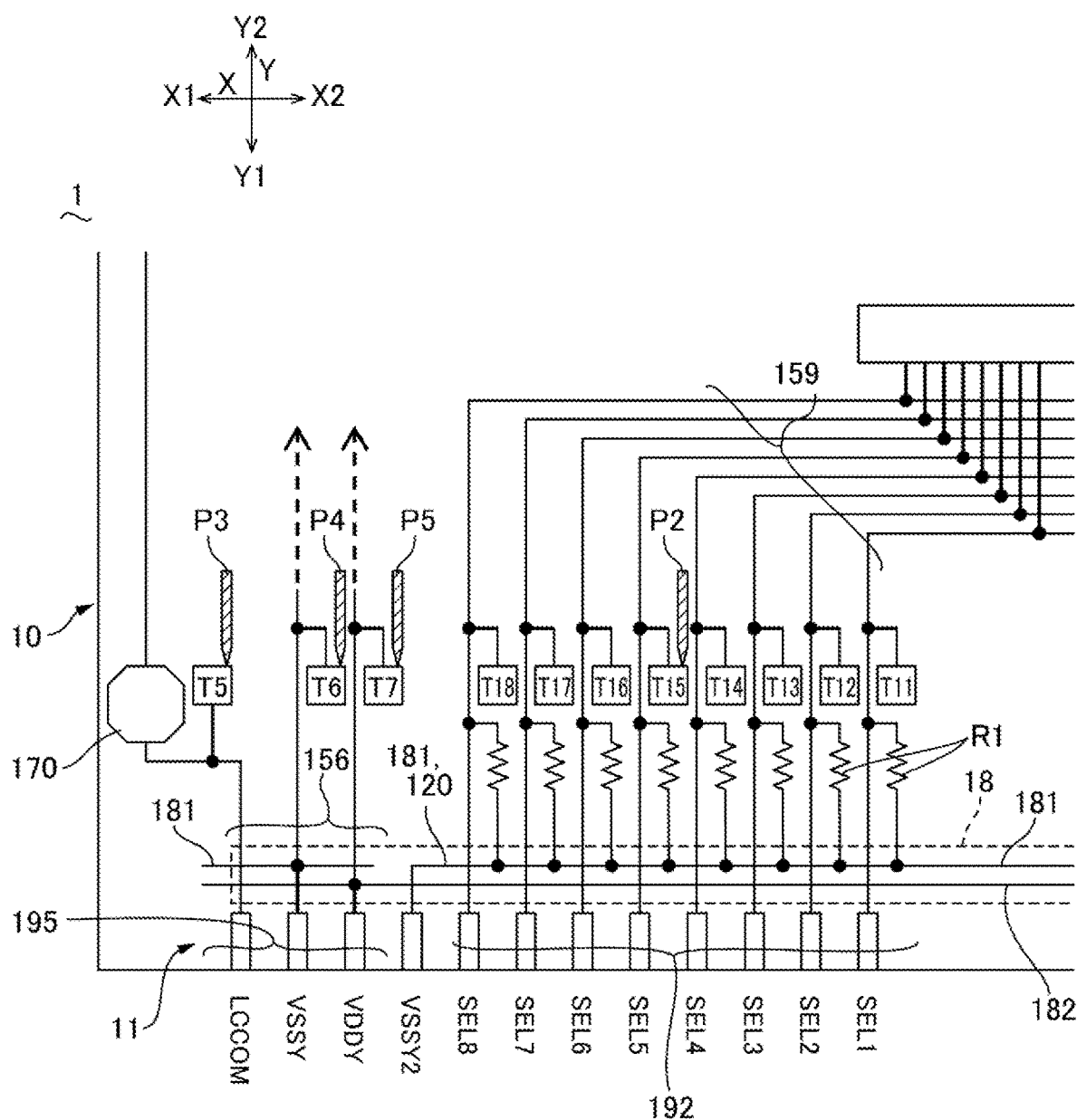
FIG. 14 is an explanatory diagram of an electro-optical device according to Embodiment 8 of the present disclosure.

FIG. 14 is an explanatory diagram of the electro-optical device 1 according to Embodiment 8 of the present disclosure, and is an explanatory diagram illustrating, in an enlarged manner, the periphery of the selection signal supply wiring 159 in FIG. 2. As illustrated in FIG. 14, the first substrate 10 is provided with the eight pieces of inspection terminals T11 to T18 each electrically coupled to each of the eight pieces of selection signal supply wirings 159. The first substrate 10 is also provided with the input terminal 195 for the other negative power source VSSY2 in addition to the input terminal 195 for the negative power source VSSY, where the input terminal 195 for the negative power source VSSY2 is electrically coupled with the first protection circuit wiring 181 via the constant potential wiring 156. The first protection circuit wiring 181 is divided in the middle, and the plurality of the selection signal supply wirings 159 are each electrically coupled to a part (the common wiring 120) of the first protection circuit wiring 181 via the resistance member R1, where the part is electrically coupled to the input terminal 195 for the negative power source wiring VSSY2.

Even with such a configuration, the selection signal supply wirings 159 adjacent are electrically coupled to each other via the resistance member R1 and the first protection circuit wiring 181. In addition, the first substrate 10 is not provided with the inspection terminal T10 (see FIG. 9) electrically coupled to the first protection circuit wiring 181, however, all of the eight pieces in total of the selection signal supply wirings 159 can be supplied with the selection signal, when, for example, the probe P2 is brought into contact with the inspection terminal T15 to apply the selection signal. Even when the negative power source VSSY2 is equal in electrical potential to the negative power source VSSY, which does not lead to a simplification of the layout of the wirings at the wiring substrate 60, however, the common wiring 120 does not intersect with any other wiring, except for the selection signal supply wiring 159. Thus, when abnormality occurs to the selection signal supply wiring 159, the abnormal portion can be easily specified.

Embodiment 9

Figure 15:
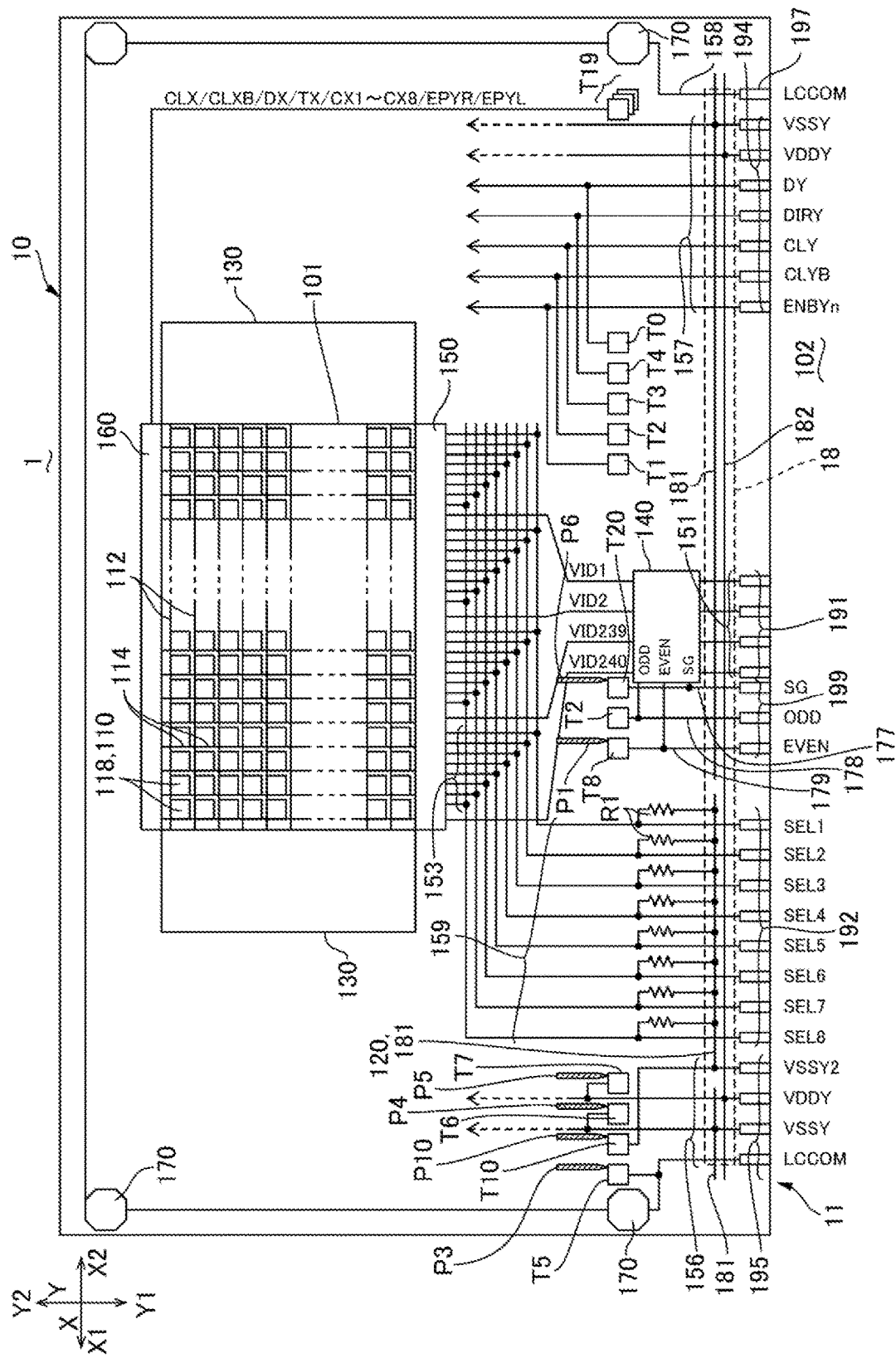
FIG. 15 is an explanatory diagram of an electro-optical device according to Embodiment 9 of the present disclosure.
Figure 16:
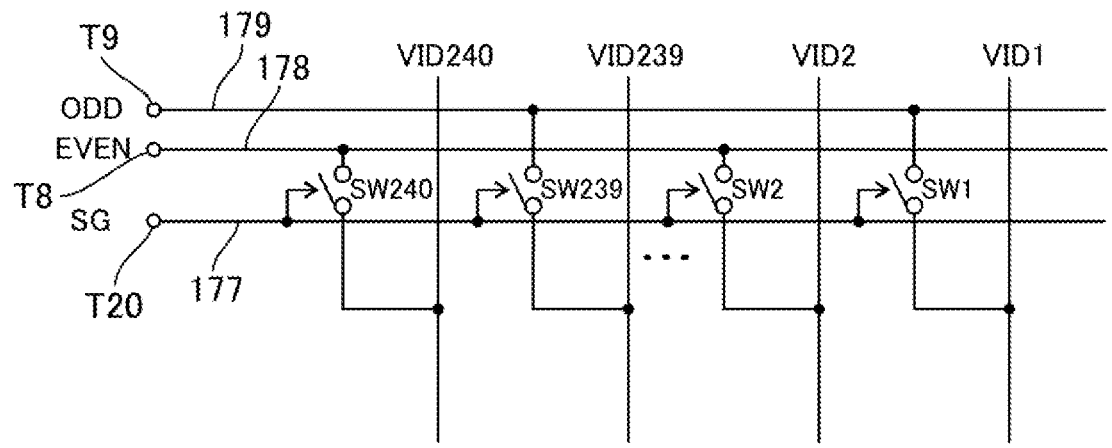
FIG. 16 is an explanatory diagram of an image signal wiring selection circuit illustrated in FIG. 15.

FIG. 15 is an explanatory diagram of the electro-optical device 1 according to Embodiment 9 of the present disclosure, and corresponds to the explanatory diagram illustrated in FIG. 2. FIG. 16 is an explanatory diagram of an image signal wiring selection circuit 140 illustrated in FIG. 15. In the embodiments described above, the electrical coupling between the inspection terminals T8 and T9 and the image signal wiring 151 corresponding to each of the blocks is established using the first inspection auxiliary wiring 173 and the second inspection auxiliary wiring 174 provided outside the region, of the large-scale substrate, which is to be divided as the first substrate 10, however, in Embodiment 9, the electrical coupling is established using the image signal wiring selection circuit 140 controlled by a control signal SG, as illustrated in FIG. 16. The image signal wiring selection circuit 140 is configured to select any one of the plurality of image signal wirings 151 provided for each of the blocks and electrically couple the image signal wiring 151 selected to an inspection terminal.

More specifically, the image signal wiring selection circuit 140 is electrically coupled to wirings 177, 178, and 179. The wiring 178 is electrically coupled with the inspection terminal T8 and an input terminal 199 for EVEN-series, and the wiring 179 is electrically coupled with the inspection terminal T9 and the input terminal 199 for ODD-series. The wiring 177 is electrically coupled with the inspection terminal T20, and the input terminal 199 for the control signal SG. Here, the ODD-series represents the image signal wirings 151 of odd-numbered ones from the side in the X2 direction, that are, VID1, VID3 to VID239. Similarly, the EVEN-series represents the image signal wirings 151 of even-numbered ones from the side in the X2 direction, that are, VID2, VID4 to VID240.

As illustrated in FIG. 16, the image signal wiring selection circuit 140 includes a switch SW electrically coupled to a location between the plurality of image signal wirings 151 of odd-numbered ones from the X2 direction side and the wiring 179, and the switch SW electrically coupled to a location between the plurality of image signal wirings 151 of even-numbered ones from the X2 direction side and the wiring 178, where the switch SW is controlled ON/OFF by the control signal SG that is input via the wiring 177.

Thus, an input of a signal to the plurality of image signal wirings 151 of even-numbered ones or a detection of the signal can be conducted via the probe P1 abutted against the inspection terminal T8 and the wiring 178, when causing the control signal SG supplied from the probe P6 to the inspection terminal T20 to turn on the switch SW electrically coupled to a location between the plurality of image signal wirings 151 of even-numbered ones from the side in the X2 direction and the wiring 178. Further, an input of a signal to the plurality of image signal wirings 151 of odd-numbered ones or a detection of the signal can be conducted via the probe P1 and the wiring 179, when causing the control signal SG supplied from the probe P6 to the inspection terminal T20 to turn on the switch SW electrically coupled to a location between the plurality of image signal wirings 151 of odd-numbered ones from the side in the X2 direction and the wiring 179 and causing the probe P1 to be brought into contact with the inspection terminal T9. Note that, when performing the display operation, an electrical potential of the input terminal 199 is fixed, and this prevents an adverse effect on the display.

Other Embodiments

In the above-described embodiments, the data lines 114 are grouped into blocks for every eight columns, however, the data lines 114 may be grouped into blocks for every 12 columns, for example, without being limited to a specific aspect of block grouping.

In the above-described embodiments, a transmissive type liquid crystal device is exemplified as the electro-optical device 1, and the present disclosure may also be applied to a reflection type liquid crystal device. In addition, as long as the present disclosure is applied to the electro-optical device 1 employing a demultiplexer scheme, the present disclosure may be applied to an electro-optical device using, for example, an Electronic Luminescence (EL) element, an electron emitting element, an electrophoretic element, and the like for the pixel 110, an electro-optical device such as a plasma display, and the like.

Installation Example to Electronic Apparatus

Figure 17:
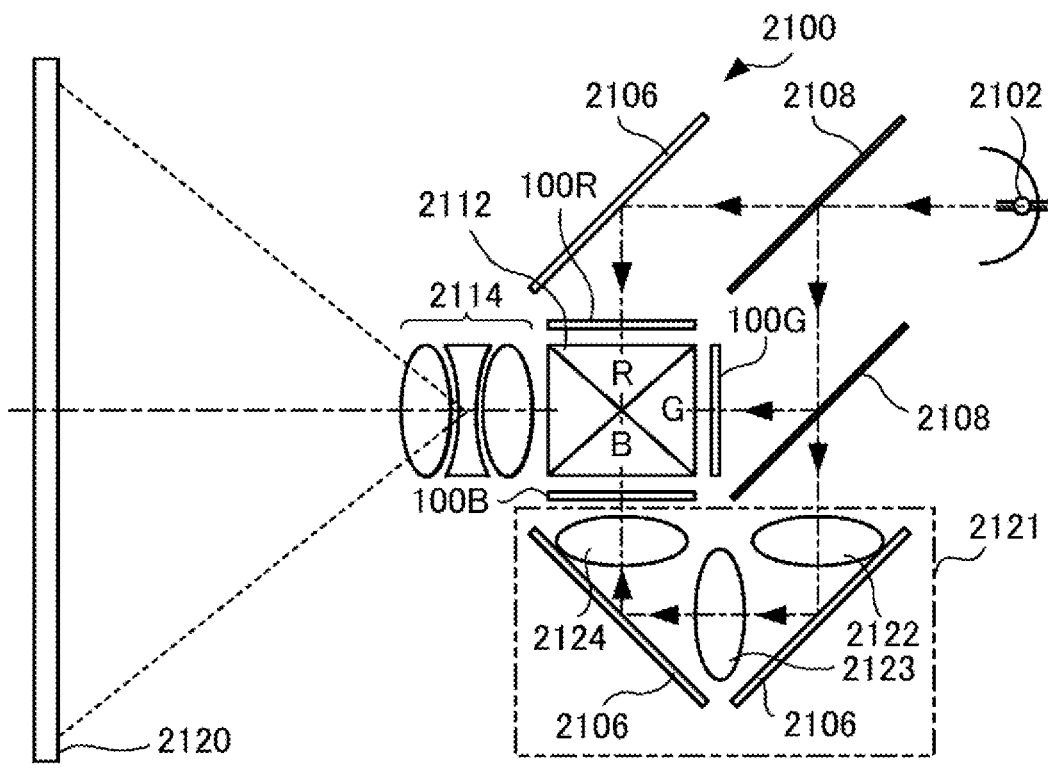
FIG. 17 is a schematic configuration diagram of a projection-type display apparatus using an electro-optical device to which the present disclosure is applied.

Electronic apparatuses using the electro-optical device 1 according to the above-described embodiments will be described below. FIG. 17 is a schematic configuration diagram of a projection-type display apparatus (an electronic apparatus) using the electro-optical device 1 to which the present disclosure is applied.

A projection-type display apparatus 2100 illustrated in FIG. 17 is an example of the electronic apparatus using the electro-optical device 1. The projection-type display apparatus 2100, in which the electro-optical device 1 is used as a light valve, achieves high definition and bright display without making the apparatus wordily large. As illustrated in this figure, there is provided, inside the projection-type display apparatus 2100, a lamp unit 2102 (a light source unit) including a white light source such as a halogen lamp. Projection light emitted from the lamp unit 2102 is split into three primary colors of R (red), G (green), and B (blue) by three mirrors 2106 and two dichroic mirrors 2108 installed inside the projection-type display apparatus 2100. The split projection light is guided to light valves 100R, 100G, and 100B each corresponding to each of the primary colors. Note that because the light of the B color has a long optical path compared to the other light of the R color and the G color, the light of the B color is guided via a relay lens system 2121 including an incidence lens 2122, a relay lens 2123, and an emission lens 2124 to prevent a loss due to the long optical path of the light of the B color.

The projection-type display apparatus 2100 is provided with three sets of a liquid crystal device including the electro-optical device 1, which each correspond to each of the R color, the G color, and the B color. The configuration of the light valves 100R, 100G, and 100B is similar to that of the electro-optical panel 100 described above, and is electrically coupled, via the wiring substrate 60, with an upper circuit inside the projection-type display apparatus 2100. Image signals designating gray scale levels of the respective primary color constituents of the R, B, and B colors are supplied from external upper circuits, respectively, and are processed by the upper circuit inside the projection-type display apparatus 2100, to cause the light valves 100R, 100G, and 100B to be driven, respectively. The light modulated by each of the light valves 100R, 100G, and 100B is incident on a dichroic prism 2112 from respective three directions. Then, at the dichroic prism 2112, the light of the R color and the light of the B color are reflected at 90 degrees, and the light of the G color passes through the dichroic prism 2112. Accordingly, images of the respective primary colors are synthesized, and then a color image is projected on a screen 2120 by a projection lens group 2114 (projection optical system).

Other Projection-Type Display Apparatuses

Note that the projection-type display apparatus may include a configuration in which an LED light source or the like configured to emit light of each of the colors is used as a light source unit, and the light of each of the colors emitted from such an LED light source is supplied to another liquid crystal device.

Other Electronic Apparatuses

The electronic apparatus including the electro-optical device 1 to which the present disclosure is applied is not limited to the projection-type display apparatus 2100 of the above-described embodiments. Examples of the electronic apparatus may include a projection-type head up display (HUD), a head mounted display (HMD), a personal computer, a digital still camera, a mobile phone, a portable digital assistant, and a liquid crystal television.

What is claimed is:

1. An electro-optical device, comprising:
   a data line;
   a switching element provided corresponding to the data line;
   a selection signal supply wiring configured to supply a selection signal to the switching element, the selection signal being for selecting one data line among a plurality of the data lines grouped into blocks; and
   a resistance member electrically connecting the selection signal supply wirings adjacent to each other.

2. The electro-optical device according to claim 1, wherein
   the resistance member is electrically connected to a common wiring.

3. The electro-optical device according to claim 2, wherein
   an inspection terminal is provided for each of the selection signal supply wirings, and
   the common wiring is not electrically connected to the inspection terminal.

4. The electro-optical device according to claim 2, wherein
   the common wiring is electrically connected to an inspection terminal.

5. The electro-optical device according to claim 4, wherein
   an inspection terminal electrically connected to the selection signal supply wiring is not provided.

6. The electro-optical device according to claim 2, wherein
   the common wiring is supplied with a constant-potential.

7. The electro-optical device according to claim 6, wherein
   the common wiring is supplied with a common-potential.

8. The electro-optical device according to claim 6, including
   a protection circuit including a protection circuit wiring to which a constant-potential is supplied, wherein
   the protection circuit wiring is electrically connected to the common wiring.

9. The electro-optical device according to claim 1, including
   an image signal wiring selection circuit configured to
   select any one of a plurality of image signal wirings provided for each of the blocks and
   electrically connect the image signal wiring selected to an inspection terminal.

10. An electronic apparatus, comprising
    the electro-optical device according to claim 1.

* * * * *